(12) United States Patent
Rivard et al.

(10) Patent No.: US 9,179,062 B1
(45) Date of Patent: Nov. 3, 2015

(54) SYSTEMS AND METHODS FOR PERFORMING OPERATIONS ON PIXEL DATA

(71) Applicant: Duelight LLC, Sunnyvale, CA (US)

(72) Inventors: William Rivard, Menlo Park, CA (US);
Adam Feder, Mountain View, CA (US);
Brian Kindle, Sunnyvale, CA (US)

(73) Assignee: Duelight LLC, Sunnyvale, CA (US)

( * ) Notice: Subject to any disclaimer, the term of this patent is extended or adjusted under 35 U.S.C. 154(b) by 0 days.

(21) Appl. No.: 14/535,282

(22) Filed: Nov. 6, 2014

(51) Int. Cl.
*H04N 5/228* (2006.01)
*H04N 9/73* (2006.01)
*H04N 5/232* (2006.01)

(52) U.S. Cl.
CPC ................................ *H04N 5/23229* (2013.01)

(58) Field of Classification Search
CPC ........................... H04N 9/735; H04N 5/23229
USPC ............................................. 348/222.1, 223.1
See application file for complete search history.

(56) References Cited

U.S. PATENT DOCUMENTS

| | | | |
|---|---|---|---|
| 5,818,977 A | 10/1998 | Tansley | |
| 6,243,430 B1 | 6/2001 | Mathe | |
| 6,498,926 B1 | 12/2002 | Ciccarelli et al. | |
| 7,256,381 B2 | 8/2007 | Asaba | |
| 7,760,246 B2 | 7/2010 | Dalton et al. | |
| 8,761,245 B2 | 6/2014 | Puri et al. | |
| 8,976,264 B2 | 3/2015 | Rivard et al. | |
| 2003/0015645 A1 | 1/2003 | Brickell et al. | |
| 2003/0142745 A1 | 7/2003 | Osawa | |
| 2006/0050165 A1 | 3/2006 | Amano | |
| 2006/0245014 A1 | 11/2006 | Haneda | |
| 2007/0025714 A1 | 2/2007 | Shiraki | |
| 2007/0030357 A1 | 2/2007 | Levien et al. | |
| 2007/0242900 A1 | 10/2007 | Chen et al. | |
| 2008/0030592 A1 | 2/2008 | Border et al. | |
| 2008/0158398 A1 | 7/2008 | Yaffe et al. | |
| 2008/0192064 A1 | 8/2008 | Hong et al. | |
| 2009/0066782 A1 | 3/2009 | Choi et al. | |
| 2009/0153245 A1 | 6/2009 | Lee | |
| 2009/0295941 A1 | 12/2009 | Nakajima et al. | |
| 2010/0118204 A1 | 5/2010 | Proca et al. | |
| 2010/0194851 A1 | 8/2010 | Pasupaleti et al. | |
| 2010/0208099 A1 | 8/2010 | Nomura | |
| 2010/0302407 A1 | 12/2010 | Ayers et al. | |
| 2011/0019051 A1 | 1/2011 | Yin et al. | |
| 2011/0090385 A1 | 4/2011 | Aoyama et al. | |

(Continued)

OTHER PUBLICATIONS

Non-Final Office Action from U.S. Appl. No. 13/573,252, dated Jul. 10, 2014.

(Continued)

*Primary Examiner* — Twyler Haskins
*Assistant Examiner* — Quang Le
(74) *Attorney, Agent, or Firm* — Zilka-Kotab, PC

(57) ABSTRACT

A system, method, and computer program product are provided for performing operations on pixel data. In use, pixel data is received. Next, a first aspect of the pixel data is identified, utilizing a hardwired logic element of the circuitry. Additionally, an operation is performed in connection with the first aspect of the pixel data, utilizing the hardwired logic element of the circuitry and a result of the operation is fed back. Further, at least one of the performing or the feeding back is repeated until the result of the operation satisfies a predetermined requirement. Additional systems, methods, and computer program products are also presented.

17 Claims, 14 Drawing Sheets

(56) References Cited

U.S. PATENT DOCUMENTS

| | | |
|---|---|---|
| 2011/0115971 A1 | 5/2011 | Furuya et al. |
| 2011/0134267 A1 | 6/2011 | Ohya |
| 2011/0194618 A1 | 8/2011 | Gish et al. |
| 2011/0242334 A1 | 10/2011 | Wilburn et al. |
| 2011/0280541 A1 | 11/2011 | Lee |
| 2012/0002089 A1 | 1/2012 | Wang et al. |
| 2012/0033118 A1 | 2/2012 | Lee et al. |
| 2012/0069213 A1 | 3/2012 | Jannard et al. |
| 2012/0162465 A1 | 6/2012 | Culbert et al. |
| 2012/0262600 A1 | 10/2012 | Velarde et al. |
| 2012/0314100 A1 | 12/2012 | Frank |
| 2013/0107062 A1 | 5/2013 | Okazaki |
| 2013/0114894 A1 | 5/2013 | Yadav et al. |
| 2013/0147979 A1 | 6/2013 | McMahon et al. |
| 2013/0176458 A1 | 7/2013 | Van Dalen et al. |
| 2013/0223530 A1 | 8/2013 | Demos |
| 2013/0271631 A1 | 10/2013 | Tatsuzawa et al. |
| 2013/0279584 A1 | 10/2013 | Demos |
| 2013/0301729 A1 | 11/2013 | Demos |
| 2013/0335596 A1 | 12/2013 | Demandolx et al. |
| 2014/0098248 A1 | 4/2014 | Okazaki |
| 2014/0176757 A1 | 6/2014 | Rivard et al. |
| 2014/0211852 A1 | 7/2014 | Demos |
| 2014/0244858 A1 | 8/2014 | Okazaki |
| 2014/0247979 A1 | 9/2014 | Roffet et al. |
| 2014/0300795 A1 | 10/2014 | Bilcu et al. |
| 2015/0005637 A1 | 1/2015 | Stegman et al. |
| 2015/0092852 A1 | 4/2015 | Demos |
| 2015/0098651 A1 | 4/2015 | Rivard et al. |

OTHER PUBLICATIONS

Notice of Allowance from U.S. Appl. No. 13/573,252, dated Oct. 22, 2014.
Feder et al., U.S. Appl. No. 13/999,678, filed Mar. 14, 214.
Rivard, W. et al., U.S. Appl. No. 14/568,045, filed Dec. 11, 2014.
Restriction Requirement from U.S. Appl. No. 14/568,045, dated Jan. 15, 2015.
Rivard, W. et al., U.S. Appl. No. 14/534,068, filed Nov. 5, 2014.
Non-Final Office Action from U.S. Appl. No. 14/534,068, dated Feb. 17, 2015.
Rivard, W. et al., U.S. Appl. No. 14/534,079, filed Nov. 5, 2014.
Non-Final Office Action from U.S. Appl. No. 14/534,079, dated Jan. 29, 2015.
Rivard, W. et al., U.S. Appl. No. 14/534,089, filed Nov. 5, 2014.
Non-Final Office Action from U.S. Appl. No. 14/534,089, dated Feb. 25, 2015.
Rivard, W. et al., U.S. Appl. No. 14/535,274, filed Nov. 6, 2014.
Non-Final Office Action from U.S. Appl. No. 14/535,274, dated Feb. 3, 2015.
Rivard, W. et al., U.S. Appl. No. 14/535,279, filed Nov. 6, 2014.
Non-Final Office Action from U.S. Appl. No. 14/535,279, dated Feb. 5, 2015.
Non-Final Office Action from U.S. Appl. No. 14/536,524, dated Mar. 3, 2015.
Rivard, W. et al., U.S. Appl. No. 14/536,524, Nov. 7, 2014.
Non-Final Office Action from U.S. Appl. No. 14/568,045, dated Mar. 24, 2015.
Notice of Allowance from U.S. Appl. No. 14/534,079, dated May 11, 2015.
Notice of Allowance from U.S. Appl. No. 14/535,274, dated May 26, 2015.
Notice of Allowance from U.S. Appl. No. 14/534,089, dated Jun. 23, 2015.
Notice of Allowance from U.S. Appl. No. 14/536,524, dated Jun. 29, 2015.
Notice of Allowance from U.S. Appl. No. 14/534,068, dated Jul. 29, 2015.
Notice of Allowance from U.S. Appl. No. 14/535,279, dated Aug. 31, 2015.
Final Office Action from U.S. Appl. No. 14/568,045, dated Sep. 18, 2015.

SYSTEMS AND METHODS FOR PERFORMING OPERATIONS ON PIXEL DATA

RELATED APPLICATIONS

This application is related to the following U.S. patent application, the entire disclosures being incorporated by reference herein: application Ser. No. 13/573,252, filed Sep. 4, 2012, entitled "IMPROVED COLOR BALANCE IN DIGITAL PHOTOGRAPHY"; application Ser. No. 13/999,678, filed Mar. 14, 2014, entitled "SYSTEMS AND METHODS FOR DIGITAL IMAGE SENSOR"; application Ser. No. 14/534,068, filed Nov. 5, 2014, entitled "SYSTEMS AND METHODS FOR HIGH-DYNAMIC RANGE IMAGES."

FIELD OF THE INVENTION

The present invention relates to digital photographic systems, and more particularly to systems and methods for performing operations on pixel data.

BACKGROUND

Traditional digital photography systems are inherently limited by the dynamic range of a capturing image sensor. One solution to such limitation is the use of high dynamic-range (HDR) photography. HDR photography involves capturing multiple exposures of a same scene, where each of the exposures is exposed differently, and then merging the multiple captures to create an image with a larger dynamic range.

SUMMARY

A system, method, and computer program product are provided for performing operations on pixel data. In use, pixel data is received. Next, a first aspect of the pixel data is identified, utilizing a hardwired logic element of the circuitry. Additionally, an operation is performed in connection with the first aspect of the pixel data, utilizing the hardwired logic element of the circuitry and a result of the operation is fed back. Further, at least one of the performing or the feeding back is repeated until the result of the operation satisfies a predetermined requirement. Additional systems, methods, and computer program products are also presented.

DETAILED DESCRIPTION

Figure 1:
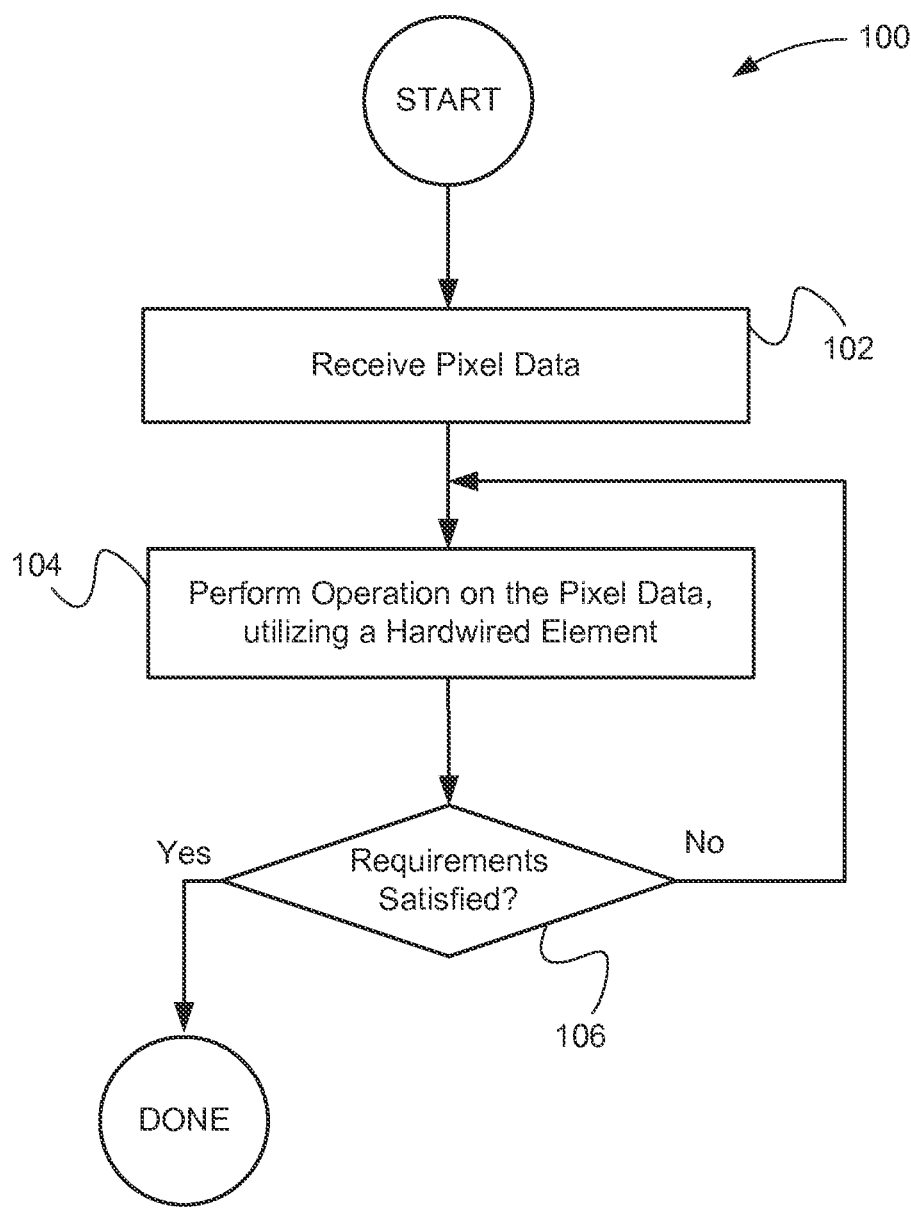
FIG. 1 illustrates an exemplary flow diagram for performing operations on pixel data utilizing a hardwired element, in accordance with one possible embodiment.

FIG. 1 shows an exemplary flow diagram 100 for performing operations on pixel data utilizing a hardwired element, in accordance with one embodiment. As an option, the flow diagram 100 may be implemented in the context of the details of any of the Figures. Of course, however, the flow diagram 100 may be carried out in any desired environment. Further, the aforementioned definitions may equally apply to the description below.

As shown, the operation begins in step 102 by receiving pixel data. In one or more embodiments, the pixel data may include exposure data, exposure statistics, color data, color statistics, color space data, intensity data, saturation data, luminance data, chrominance data, and/or any other data which may be associated with a pixel in some manner. In various embodiments, the pixel data may be received by an image sensor. In other embodiments, the pixel data may be associated with a compressed photo which is used for editing.

In one embodiment, the color data and/or color statistics may include a data relating to a white balance. For example, in various embodiments, color channels (e.g. red, green, blue color channels, etc.) may be used to determine the intensity of the color balance, which may then be used to perform a correction of the white balance on the associated image. In some embodiments, the color statistics may be associated with a curve and/or some other mathematical modeling of white balance.

In other embodiments, the color data and/or color statistics may be used for color matching. For example, in one embodiment, the color matching may be used to correlate one or more images prior to a merge or blending of the one or more images (e.g. HDR mix, etc.). In various embodiments, color statistics may be computed to aid in determining the color associated with the pixel data.

As shown, in response to receiving pixel data, an operation is performed in step 104 on the pixel data, utilizing a hardwired element. In various embodiments, an operation may include adjusting the exposure, adjusting the white balance, adjusting metering the pixel data, adjusting focus, and/or adjusting any feature associated with the pixel data.

In some embodiments, the operation may be performed while the pixel data is within a camera module. For example, in one embodiment, the operation may be performed on the data while it is in transit between an image sensor and an image controller, both of which may be located in a camera module. In other embodiments, the operation may be performed while the pixel data is in transit between a camera module and an application processor. Of course, the operation may be performed on pixel data at any point in a camera module and/or any other module or processor associated with an image sensor.

In one embodiment, the operation being performed may occur utilizing a hardwired element. Similar to the operation which may be performed on the pixel data, the hardwired element may be located within a camera module, an application processor, and/or any other module or processor associated with an image sensor.

As shown, in decision 106, it is determined whether requirements are satisfied. Of course, in one embodiment, the requirements may include one or more requirements. In various embodiments, the one or more requirements may include determining whether the pixel data is within a set range. For example, in one embodiment, pixel data may include exposure, and a requirement may include having a median exposure point within a set numeric range. For example, a numeric range associated with pixel intensity may be from 0.0 to 1.0, and a median exposure point of 0.5 may indicate that an image is within a target exposure range. In other embodiments, a requirement may include ensuring that a set percentage of pixel data is not within a top 5% and bottom 5% of exposure data. For example, in one embodiment, a requirement may be to ensure that no more than 5% of the pixel data is in the top 5% of exposure data. As such, the pixel data may be continually fed back into the image sensor until no more than 5% of pixel data is in the top 5% of exposure data.

In other embodiments, a requirement may be associated with a histogram. For example, in one embodiment, the numeric range may be based on a histogram output of the pixel data. In another embodiment, the histogram may be used to determine the spread of intensities of pixels associated with, for example, exposure and/or any other parameter associated with the pixel data. For example, in one embodiment, the number of pixels at each exposure may be counted, and a requirement may be that a set number of pixels must fall within a set portion of the histogram. For example, the number of pixels in the top and bottom 5% of the histogram may be determined, and a requirement may be that the 90% of the pixels (e.g. as determined by counting, etc.) must fall in the region between 5% and 95% of the histogram. Of course, in other embodiments, the region and/or requirement may be any value.

In one embodiment, the requirement may be set by a user. For example, in one embodiment, the user may select and/or input a range, value, median, distribution, and/or any other constraint which may be used as a requirement. In another embodiment, the requirement may be set automatically. For example, in one embodiment, optimized settings may be associated with pixel data, and the optimized settings may include one or more requirements. For example, in one embodiment, it may be determined that the user is using a camera module associated with mobile device X, and that the image blows out a high percentage of the pixel data (e.g. large count of pixel data may be in the overexposed range of greater than 90% on a histogram distribution, etc.). In view of this, optimized settings may include correcting a lens distortion known to be present with mobile device X (e.g. apply a distortion correction with a set point, etc.), applying a target percentage of at least 80% of the pixel data not contained in the bottom or top 5% of the histogram distribution, and/or taking any other action to apply an optimized setting(s). In some embodiments, the one or more requirements may come from a parameter associated with a device (e.g. Apple iPhone, Samsung Galaxy, Canon Mach 3, Nikon D, Panasonic Lumix, etc.).

In other embodiment, the one or more requirements may be associated with an individual user, with two or more individuals (e.g. group settings, group sharing, etc.), with a remote entity (e.g. dropbox, Google Drive, Box.com, etc.), and/or any other source. In some embodiments, the one or more requirements may be stored on the device (e.g. local memory of the device, etc.), may be transferred from another device (e.g. via Bluetooth, via WiFi, via WiFi direct, etc.), may be stored in the cloud (e.g. Facebook, Dropbox, Google Drive, Microsoft One, etc.), and/or any other storage location.

As shown, if the requirements are satisfied, then the flow is complete. However, if the requirements are not satisfied, then the flow loops back to performing an operation on the pixel data, utilizing a hardwired element. See operation 106. In some embodiments, the operation may change based off of feedback. For example, in one embodiment, it may be determined that the white balance was not correct (e.g. based off of pixel count, etc.). As such, the white balance may be modified until the white balance is within a threshold of, or reaches, a predetermined value.

In various embodiments, utilizing a hardwired element may help to quickly meter a scene and/or image, and/or adjust a parameter associated with pixel data. In some embodiments, the hardwired element may be used to correct deficiencies associated with the image sensor, camera lens, and/or another element associated with the camera module. As such, utilizing the hardwired element may aid in decreasing time for control loops. For example, in one embodiment, the pixel data may be metered, and a parameter (e.g. exposure, etc.) may be evaluated in a hardwired element to determine if it complies with a set requirement. If it does comply, the image is captured. If it doesn't comply, a setting associated with the parameter is altered to comply with the requirement. In some embodiments, the control loop may need to be repeated several times before the requirement is satisfied.

Figure 2:
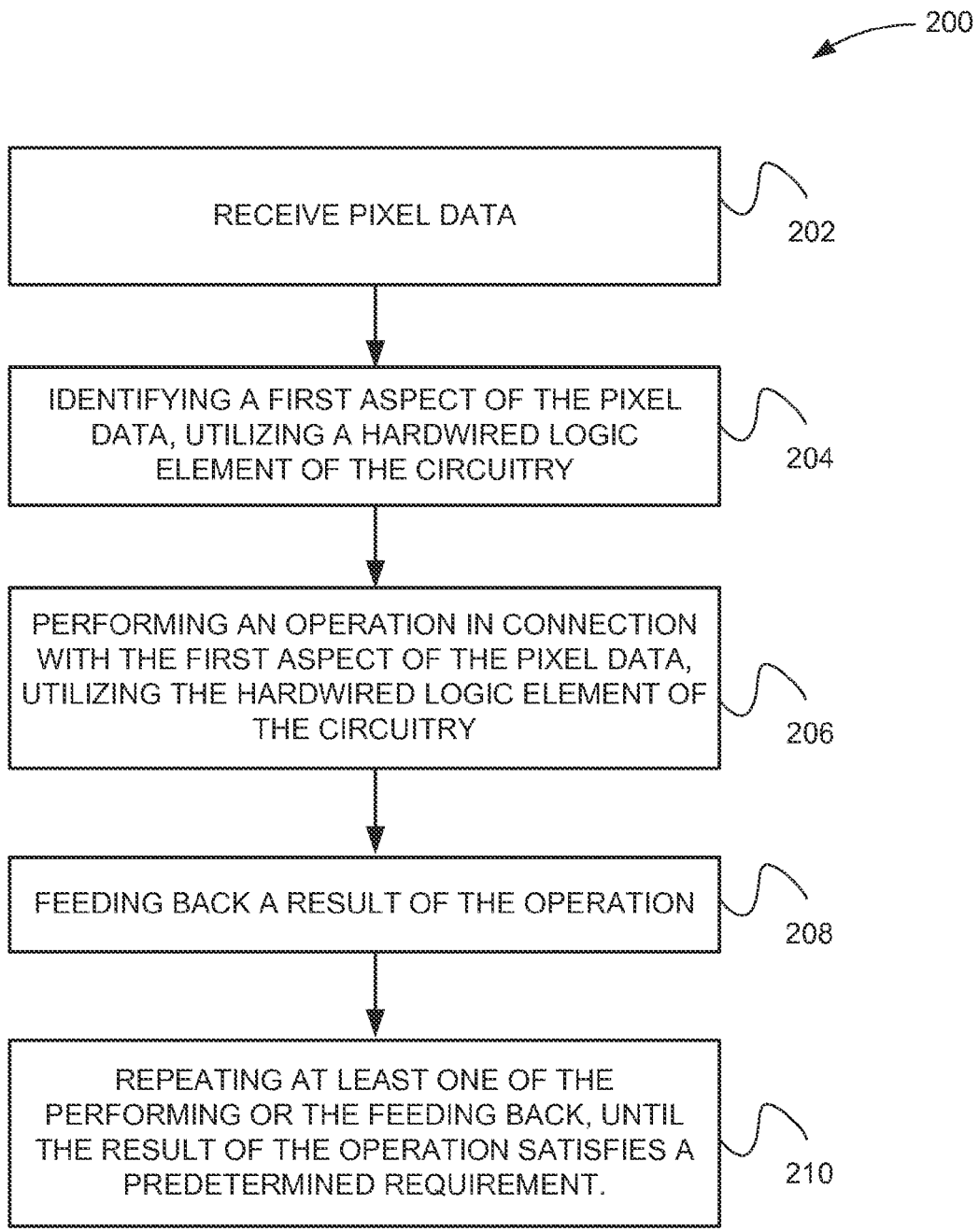
FIG. 2 illustrates an exemplary method carried out for performing operations on pixel data utilizing a hardwired element, in accordance with one embodiment.

FIG. 2 shows an exemplary method 200 for performing operations on pixel data utilizing a hardwired element, in accordance with one embodiment. As an option, the method 200 may be implemented in the context of the details of any of the Figures. Of course, however, the method 200 may be carried out in any desired environment. Further, the aforementioned definitions may equally apply to the description below.

As shown, pixel data is received. See operation 202. Additionally, a first aspect of the pixel data is identified, utilizing a hardwired logic element of circuitry. See operation 204. Further, an operation is performed in connection with the first aspect of the pixel data, utilizing the hardwired logic element of the circuitry. See operation 206.

In one embodiment, pixel data may be received from an image sensor. In some embodiments, the pixel data may include a single scalar element of data received from an image sensor, and/or may include a one or more sets of intensities for data received from an image sensor.

In various embodiments, the operation 206 may occur, at least in part, in an application processor, and/or in a camera module. In a separate embodiment, the operation may occur entirely in a camera module. Of course, in other embodiments, the operation may occur in any processor and/or module associated with the image sensor.

In one embodiment, a first aspect may include at least one of a white balance, a focus, an exposure, an intensity, and/or any other parameter associated with the pixel data. In one embodiment, the first aspect of the pixel data may include two or more points of interest in the pixel data. Additionally, the two or more points of interest may include at least one of two or more points of white balance, two or more points of focus, two or more points of exposure, two or more points of intensity, and/or two or more points of another parameter associated with the pixel data. Additionally, a point of interest may include a region of pixels within the pixel data.

In various embodiments, having two or more points of interest may be related. For example, in one embodiment, a first point of interest may relate to a first white point and a second point of interest may relate to a second white point, and the first aspect may include both the first and second white point. In some embodiments, parameters related to the first and second points of interest may be blended, mixed, normalized, averaged, and/or otherwise combined in some manner, such that the combined information is used as a first aspect of the pixel data.

In other embodiments, the two or more points of interest may not be related. For example, in one embodiment, a first point of interest may relate to an exposure setting for a part of an image that shows the outdoors, and a second point of interest may relate to an exposure setting for a part of the image that shows the indoors. Of course, in other embodiments, a point of interest may be associated with any location of a photo, and the point of interest may be associated with any parameter of the pixel data.

Still yet, in one embodiment, identifying the first aspect may include summing one or more values for a region associated with the pixel data, and determining a range of highest points associated with the pixel data for the region. In one specific embodiment, performing the operation may be based on a range of highest points associated with pixel data for a region. Of course, in other embodiments, any mathematical operation may be used to perform the operation.

As shown, a result of the operation is fed back. See operation 208. In one embodiment, feeding back the result of the operation may include providing the result to the image sensor. In some embodiments, in response to feeding back the result to an image sensor, the image sensor may adjust a parameter to increase the probability that it will comply with a requirement.

In one embodiment, a result of the operation may to include at least one of an outcome of normalizing or summing elements associated with an exposure of the pixel data, an outcome of normalizing or summing elements associated with a white balance of the pixel data, an outcome of normalizing or summing elements associated with a focus of the pixel data, an outcome of normalizing or summing elements associated with an intensity of the pixel data, and/or an outcome of a mathematical operation.

In one embodiment, a first aspect may be associated with a white balance value, and feeding back the result of the operation may include adjusting the pixel data based on the white balance value. Additionally, in one embodiment, the adjusting may occur utilizing the hardwired logic element of the circuity. In a separate embodiment, the adjusting may occur entirely within a camera module.

Additionally, as shown, at least one of the performing an operation in connection with the first aspect of the pixel data, utilizing the hardwired logic element of the circuitry or the feeding back a result of the operation is repeated, until the result of the operation satisfies a predetermined requirement. See operation 210.

In one embodiment, the requirement may involve at least one of a maximum value, a threshold value, and/or a range. In one embodiment, the requirement may involve a range, and the range may include at least a median value. Further, in another embodiment, the requirement may involve a range, and the range may include a 40%-60% distribution associated with a first aspect (e.g. exposure, saturation, intensity, color, white balance, etc.) of the pixel data. Still yet, in one embodiment, the requirement may involve a range, and the range may include a specific set point associated with the first aspect of the pixel data.

In various embodiments, a camera module may be provided in association with a lens assembly which focuses an aperture (e.g. with or without and adjustable aperture, etc.) to capture optical information onto the image sensor. In one embodiment, a controller may be provided also within a camera module. Including a controller may aid in reducing heat on the image sensor, thereby decreasing potential noise of the resulting captured image. Of course, in some embodiments, an analog to digital converter may be contained within the image sensor, may be provided on the controller, and/or may be located anywhere within a camera module and/or another module associated with the image sensor.

In one embodiment, the camera module may include optics (e.g. lens, etc.), an image sensor, a controller, as well as the ability to couple any of the foregoing components to an application processor. Additionally, in one embodiment, the image sensor may provide image data which may be processed in hardware (e.g. within the camera module, etc.), or in processing kernel (e.g. application processor, etc.). Of course, in other embodiments, the data may be processed at any point after being initially captured by the image sensor.

In another embodiment, performing an operation in connection with the first aspect of the pixel data may include focus metering. For example, in one embodiment, an image sensor may include a focus actuator where, when pixel data is inputted into a camera module hardwired logic element, the result is fed back into the image sensor to adjust the focus actuator. In this manner, the focus can occur very quickly and very accurately. For example, in one embodiment, the image sensor may do an initial sweep, then overshoot the pixel data, and then apply optimized settings (e.g. based on the feedback result, etc.) to comply with a requirement. In one embodiment, the image sensor may capture pixel data at a lower resolution, feed the pixel data to a hardwired logic element of the circuitry, and refine the settings prior to capturing the pixel data at a higher resolution.

In one embodiment, performing an operation in connection with the first aspect of the pixel data may include counting the number of pixels to the side of a median value. For example, in one embodiment, if more pixels are evaluated to the right of a median value, then the image sensor may lower the ISO, shorten the exposure time, and/or take any other action to prevent the pixel data from being overblown. Of course, in other embodiments, adjusting the exposure time and/or ISO (or potentially other parameters associated with the image sensor) may directly shift the histogram, thereby allowing adjustments to be made to comply with a requirement.

In another embodiment, a count of pixels may include one or more groups of data. For example, in one embodiment, pixel data may be processed using statistics, wherein the statistics includes a counter to determine whether each pixel's intensity falls between 0-0.5 and 0.5-1.0 on an intensity histogram. In this manner, each pixel is classified into two groupings, and each group is counted. Of course, in other embodiments, the median value may be any value, and the operation (e.g. greater than, equal, less than, etc.) may be used to compare the groupings of data. Additionally, the counting of pixels may occur utilizing a hardwired logic element on the circuitry.

As a separate example, in one embodiment, if pixel data is found to be completely left of the median (e.g. 0-0.5, etc.) for an intensity histogram, then the pixel data may be significantly underexposed. Additionally, if pixel data is found to be completely right of the median (e.g. 0.5-1.0, etc.) for an intensity histogram, then the pixel data may be significantly overexposed. Of course, in various embodiments, using a hardwired logic element to modify ISO, exposure times, and other parameters associated with the image sensors may assist in getting a more even distribution of pixels across an intensity histogram.

Still yet, in another embodiment, any type of statistics (or mathematical operation) may be used to compute a count or any other result which may then be used by the image sensor to determine if the result complies with a predetermined requirement. In one embodiment, utilizing a hardwired logic element rather than involving software and/or a memory module, may aid in decreasing the amount of time necessary to process the pixel data.

In another embodiment, one or more groups of pixel data may be used to determine brightness, focus, exposure, and/or any other parameter associated with the pixel data. In one embodiment, a portion of the entire pixel data, rather than all of the pixel data, may be used for processing. For example, in one embodiment, 1000 incoming pixels may be queued to be processed, and after processing 100 pixels, it is determined that the count of pixels for just the first 100 pixels exceeds a certain threshold (e.g. count of pixels above a certain intensity histogram range, etc.). In such an embodiment, the 900 remaining pixels may not be processed, thereby decreasing the amount of time needed for processing. As such, in some embodiments, if a certain amount of pixels surpass a threshold, that may trigger giving immediate feedback to the image sensor without processing the rest of the pixels.

In some embodiments, the image sensor may take into consideration the feedback result (e.g. from the hardwired logic element, etc.), the manufacture of the camera module, the manufacture of the lens assembly (e.g. to correct for chromatic deficiencies, etc.), and/or any other information which may affect the pixel data and which can be corrected in some manner by the image sensor. Of course, in various embodiments, settings applied by the image sensor may account for best operating parameters (e.g. for the lens, for the camera module, etc.).

In one embodiment, rather than computing a mathematical operation (e.g. count the pixels falling into groups, etc.), a processor (e.g. application processor, etc.) may be used to process pixel data (e.g. compare exposure to tables associated with the image sensor, etc.). However, in such an embodiment, rather than involving all of the system memory (e.g. of the application processor, etc.), the processor may use one or more references tables (e.g. associated with the image sensor, etc.) to assist in processing the pixel data. The tables may be used by the application processor to look up and then process a decision based on the pixel data value and the corresponding look up value.

In various embodiments, look ups may occur at a variety of locations, including the camera module, the application processor, within software (e.g. located on an application processor, located on a camera module, etc.), a device driver (e.g. within an application processor module, etc.), and/or any location capable of performing a look up and performing a decision based on the look up.

Of course, in another embodiment, once a pixel has been grouped, additional sub-groups may be created with a grouping. For example, in one embodiment, it may be determined that a pixel falls in the 0-0.5 intensity histogram group. However, falling into a 0-0.1 bucket (e.g. severely underexposed, etc.) may be considerably different than falling into a 0.1-0.5 bucket (e.g. some underexposure, etc.). As such, sub-groups within a grouping may be used as needed to extract relevant information (e.g. count of pixels within 0-0.1 range with triggers based on thresholds, etc.).

In other embodiments, at least some processing may involve both a hardwired logic element and one or more software elements. For example, in one embodiment, a hardwired logic element may be used to adjust the exposure settings for pixel data. After quickly refining the exposure settings in the hardwired logic element, the pixel data may be forwarded on to be further processed by a software module (e.g. in the camera module, in the application processor, etc.). For example, in one embodiment, the hardwired logic element may refine the exposure based on a median value as determined by an intensity histogram. However, in some instances, it may be desired to allow the pixel data to remain overexposed, in which case the median value as set by the hardwired logic element may not be correct. In one embodiment, software (e.g. driver, proprietary software, etc.) may be used to adjust the image so that the resulting image is not based solely off of median (or any mathematical statistic) value, but takes into consideration optimized settings which can be implemented.

In one embodiment, the software may be controlled, at least in part, by a user. For example, in various embodiments, the user may adjust the median value of the histogram, and/or may give some other feedback which can be used to adjust the photo. In other embodiments, the software may implement optimized settings as determined by a manufacture, by a cloud based source (e.g. best settings to be implemented for a camera, etc.), and/or by any other source. As such, in some embodiments, the user may bypass settings as applied by a hardwired logic element and/or a software element associated with the image sensor. Additionally, in this manner, the user may purposefully meter extra light, and/or meter extra dark as applied to the pixel data.

In one embodiment, a device driver may be used to determine a range associated with the pixel data. For example, in one embodiment, it may be desired to not focus on completely dark or completely light pixels. In such an embodiment, histogram data may be multiplied by a predefined curve, the result of which may be fed back to the image sensor to adjust the capture of the pixel data. Additionally, in one embodiment, multiplying the histogram data by an curve may allow the pixels in the middle of the histogram distribution to be the focus of the result.

In various embodiments, the pixel data may be categorized using a histogram. In other embodiments, if 8 bits of resolution were used (e.g. 8-bit color, etc.), the categorization could include 256 groups (e.g. maximum number of color groupings for 8-bit color, etc.) which may allow for finer granularity. Of course, any method may be used to categorize the pixel data.

In some embodiments, the feeding back may include a result based on the mathematical computation (e.g. counting of pixels in groups, etc.). In other embodiments, the feeding back may include updated exposure parameters as determined by the hardwired logic element. For example, in one embodiment, if the pixel data was overexposed, the updated exposure parameters may include lowering an ISO, increasing the shutter speed, narrowing the aperture (e.g. changing the f-stop to a higher number, etc.), and/or applying any other setting which may limit the amount of light entering the image sensor. Of course, in other embodiments, any instruction and/or parameter may be fed back to the image sensor which may then be used to alter the capture of the image.

In some embodiments, a point of interest may include a secondary region. For example, in one embodiment, the secondary region may include a border region around a point of interest. In various embodiments, the border region may be used to determine a difference in exposure (e.g. inside exposure v outside exposure, etc.), and/or be used to determine an edge. In one embodiment, an edge may be used to apply more than one filter and/or setting. For example, in one embodiment, a detected edge may cause a first exposure to be applied to a first region and a second exposure to be applied to a second region. Of course, in other embodiments, any parameter in association with the detected edge may be used. Additionally, in other embodiments, a secondary region may include any region of the photo and/or a point of interest.

In one embodiment, the edge may be detected based on a user input. For example, in one embodiment, the user may trace a pattern which is used for edge detection. In some embodiments, the traced pattern may define the edge to be applied. In other embodiments, the traced pattern may determine a region of the image to be used for automatic edge detection. For example, in one embodiment, the user may trace a region to correspond with an edge to be applied. Based on the traced region, the device may then automatically detect the edge.

In other embodiments, the edge may be detected automatically. For example, in one embodiment, a device may increase the contrast, filter the image by one or more channels (e.g. red, green, blue, etc.), and/or apply any other parameter to aid in determining an edge. Of course, in one embodiment, parameters applied to the image in order to aid in determining an edge may be temporary and applied for purposes only of determining an edge. In another embodiment, an edge may be detected by analyzing a difference in color, brightness (e.g. exposure, etc.), and/or any other parameter associated with the pixel data. Of course, in other embodiments, any technically feasible method for detecting an edge may be used.

Still yet, in one embodiment, a point of interest may be mapped using a variety of methods, including, but not limited to, a one-to-one mapping (e.g. identify region on CCD and then identify region on image sensor, etc.), a row select and a column select (e.g. based on point of interest and/or region selected, etc.), a full frame metering (e.g. discard data which is not needed and/or relevant, etc.), and/or any other method which may be used to select a region or point of interest in some manner. In one embodiment, a whole frame associated with the pixel data may be obtained, and then all rows and/or columns which were not selected via the selected region may be discarded. In this manner, pixel data associated with the selected region may be used a basis for further processing and/or analysis.

In one embodiment, a hardware logic element may be used to correct a first parameter (e.g. overall exposure, etc.), and software may be used to correct a second parameter (e.g. region specific exposure, etc.). In other embodiments, the hardware logic element and software may be used individually or in combination in any manner to correct one or more parameters.

In another embodiment, an image may be output based on a blending of two or more parameters. For example, in one embodiment, pixel data associated with a first ISO may be captured, and pixel data associated with a second ISO may be captured, and the pixel data from both ISOs may be blended. Additionally, pixel data associated with a first ISO may relate to a first region and pixel data associated with a second ISO may relate to a second region, and blending the pixel data from both ISOs may include giving a preference (in blending) to the pixel data associated with the first or second regions, respectively. Of course, any portion of an image may be associated with a specific ISO and/or parameter, and blending may take into consideration the part of the image which relates to the specific ISO and/or parameter.

As an example, in one embodiment, one exposure may be associated with a first point of interest, and the hardwired logic element may be used to meter a first exposure for the first point of interest. Additionally, in such an embodiment, software may be used so that a second point of interest may be identified with a second exposure parameter. The software may then instruct the camera module (e.g. image sensor, etc.) to expose and capture one or more sets of pixel data based on the first and second identified exposure parameters. Additionally, the resulting image may be blended based on the captured one or more sets of pixel data.

In a separate embodiment, a hardwired logic element may be used to meter the entire frame of the photo at a first exposure. Additionally, a region within the frame may be selected, the region being separately metered. Based on the metered information, the image sensor may capture a first frame at a first exposure and then capture a second frame at a second exposure. In other embodiments, the image sensor may capture one set of pixel data, and two or more ISO values (or any other applicable parameter, etc.) may be applied to the pixel data.

In one embodiment, white balance may be calculated through a normalization calculation. For example, in one specific embodiment, pixel intensity associated each color channel (e.g. red, green, blue, etc.) may be individually counted. The summation of each color channel may then be used to normalize the channels wherein each of the color channels may be used to compute a white balance (e.g. in a grey world setting, etc.). In one additional embodiment, the summation and normalization of each color channel may occur on a hardwired logic element. In various embodiments, the summation and/or normalization may be used, at least in part, by a hardwired logic element in combination with software. For example, in one embodiment, the hardwired logic element may return the white balanced RGB data, and the software may take such normalized data and perform a compression (e.g. JPEG, lossless, etc.). In this manner, a resulting image (e.g. JPEG, etc.) may be based on correct white balance compensation as outputted by a hardwired logic element.

In one embodiment, the hardwired logic element may be used to focus an image. For example, in one embodiment, the pixel data may be inputted into the hardwired logic element and a frequency analysis may be performed. In one embodiment, the frequency analysis may include a fast Fourier transform ("FFT") of one or more lines of pixel data. In another embodiment, the frequency analysis may include a discrete cosine transform ("DCT") of a block of pixel data. In one embodiment, if an image is very much out of focus, and a DCT was performed on the image, there may be more low frequency energy ("low frequency components") associated with a majority of DCT blocks associated with the image. This, for example, may be contrasted with an image which is in focus, and which may include a higher number of blocks having dominantly high frequency energy ("high frequency components"), in a focused image scenario, DC and low frequency components are relatively attenuated in a majority of DCT blocks. In such an embodiment, a hardwired logic element may be used to analyze at least one or more lines of pixel data, the analysis including performing a frequency analysis.

In a particular embodiment, a line of pixel data may be inputted into a hardwired logic element and an operation may be performed on the pixel data, including a 1D Fourier transform (e.g. FFT, etc.), producing a result including both high and low frequency data. A histogram showing the frequency data may be compiled over multiple lines within an image based on summing frequency values for a particular range, and repeating the summing for multiple ranges. In this embodiment, a new line of pixel data may be inputted into a hardwired element logic, with the end summation of frequency values being computed in a histogram for a range of lines. In this manner, a complete histogram may be built based on multiple line pixel data. In one embodiment, the net value over all the lines may yield a maximum value, and the maximum value may correspond with the point at which the image may be in focus. Of course, any technically feasible method may be used to compute the maximum value associated with the curve (e.g. derivative analysis, probability analysis based on tried values, etc.).

In this manner, in various embodiments, an entire image, or one or more points of interest associated with the image, may be used as the basis for computing the focus. In another embodiment, a set of 8×8 blocks of pixel data may be inputted into a hardwired element logic and an operation may be performed on the pixel data, including a DCT, producing a result including both high and low frequency data. The frequency values may be summed for a particular range (and/or ranges) and the result may be displayed on a histogram. In one embodiment, the histogram may be used to compute the maximum value based on multiple blocks of pixel data, rows of pixel data, columns of pixel data, etc. Of course, in some embodiments, the ability to focus may operate on any image data, including a scene and/or textual information, based on the foregoing descriptions. Additionally, in one embodiment, a focus metric for a particular frame may be the sum of the high frequency components for that frame. In another embodiment, a focus metric for a particular frame comprises a median of a frequency domain histogram taken over lines comprising the frame or DCT blocks comprising the frame. In yet another embodiment, a focus metric for a particular frame comprises a high threshold (e.g., top 10%) value for a frequency domain histogram taken over lines comprising the frame or DCT blocks comprising the frame.

In other embodiments, a combination of software and hardware logic elements may be used to focus. For example, in one embodiment, a static scene may be entirely focused using hardware logic element. In another embodiment, however, a point of interest may be a child running around. In such an embodiment, software may be employed to enable tracking of the point of interest, and hardware logic element may be used to focus based on the determined location as set by the software. Of course, in other embodiments, any combination of the hardware and software may be used to focus the pixel data.

In various embodiments, computing a white balance using a hardwired logic element, as hereinabove described, may apply to display devices (e.g. monitor calibration, etc.), presentation devices (e.g. projector, etc.), between two or more devices (e.g. calibrate screens of multiple devices, etc.), and/or any other device which may be used to present pixel data in some manner. In another embodiment, computing white balance using a hardwired logic element may be used for 3D imaging, wherein more than one lens input may be correlated so that the pixel data result is consistent between the two lenses.

Figure 3A:
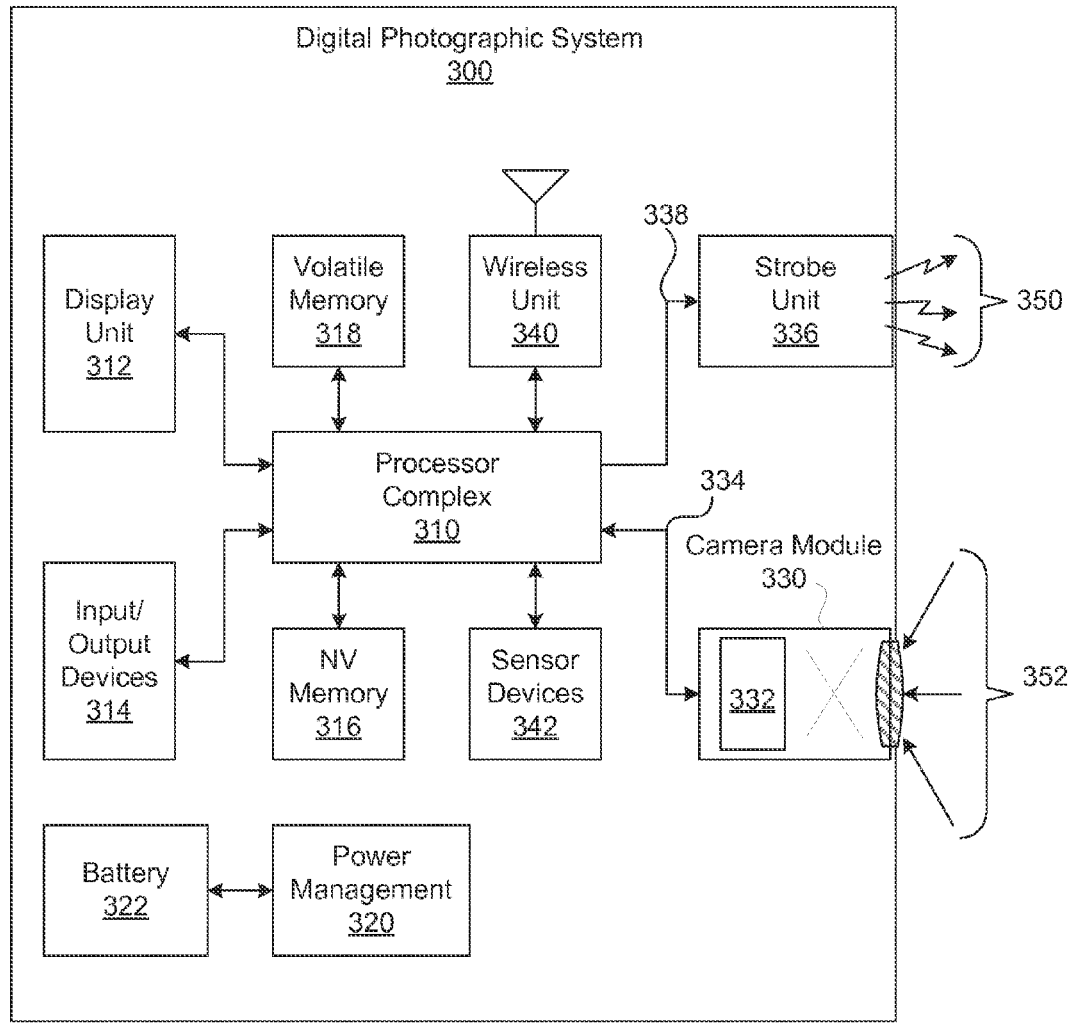
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
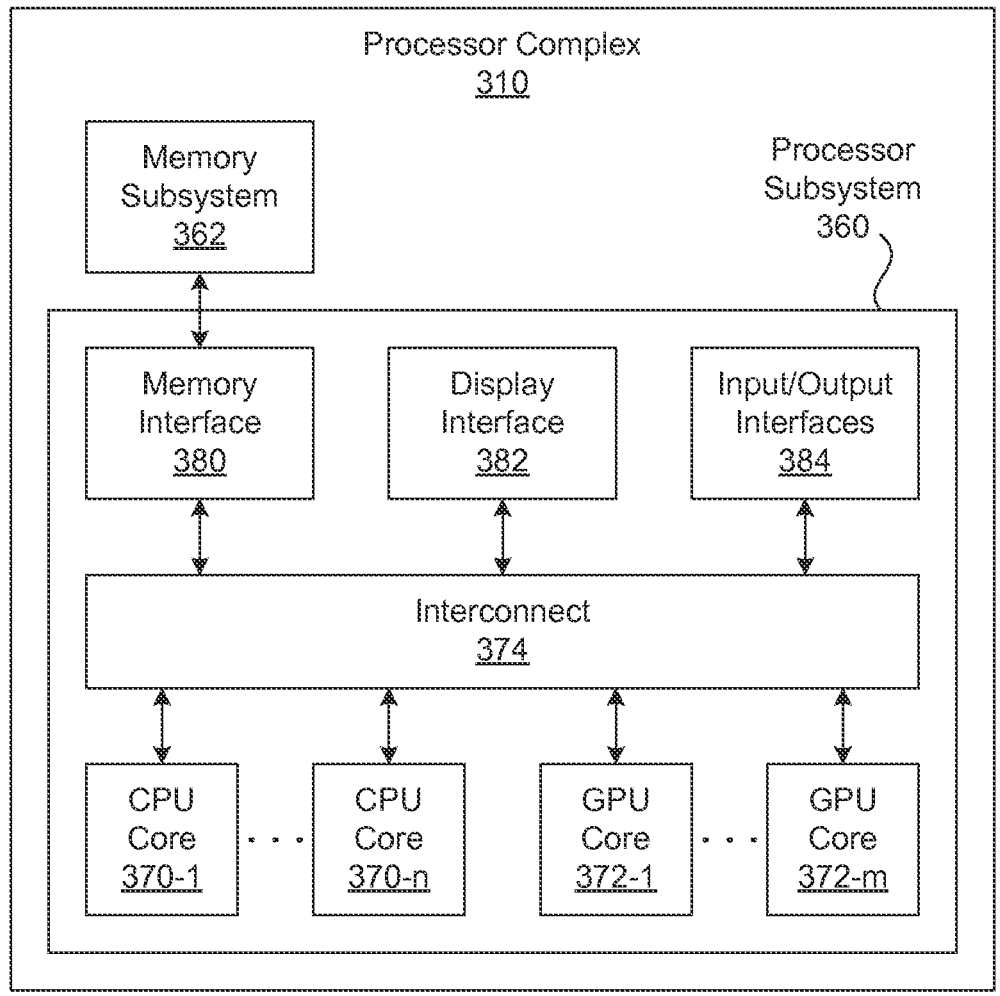
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
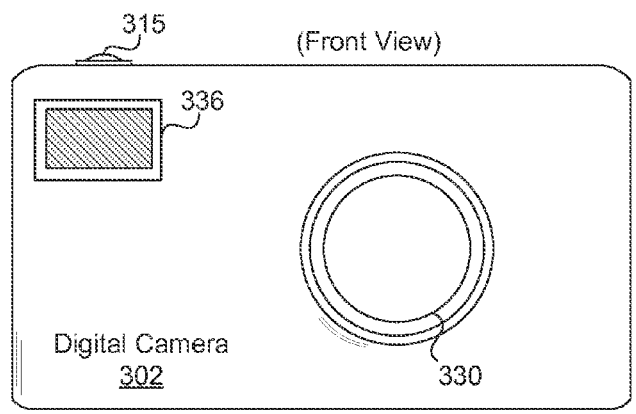
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
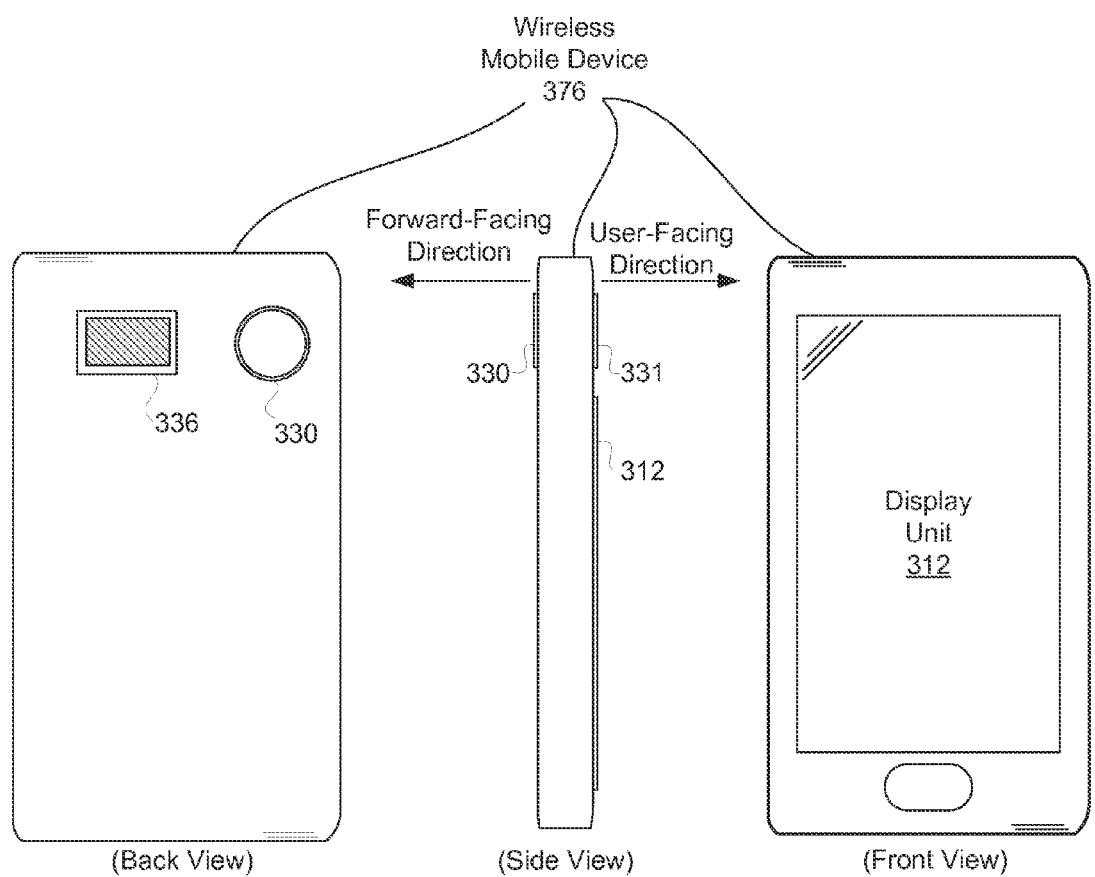
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
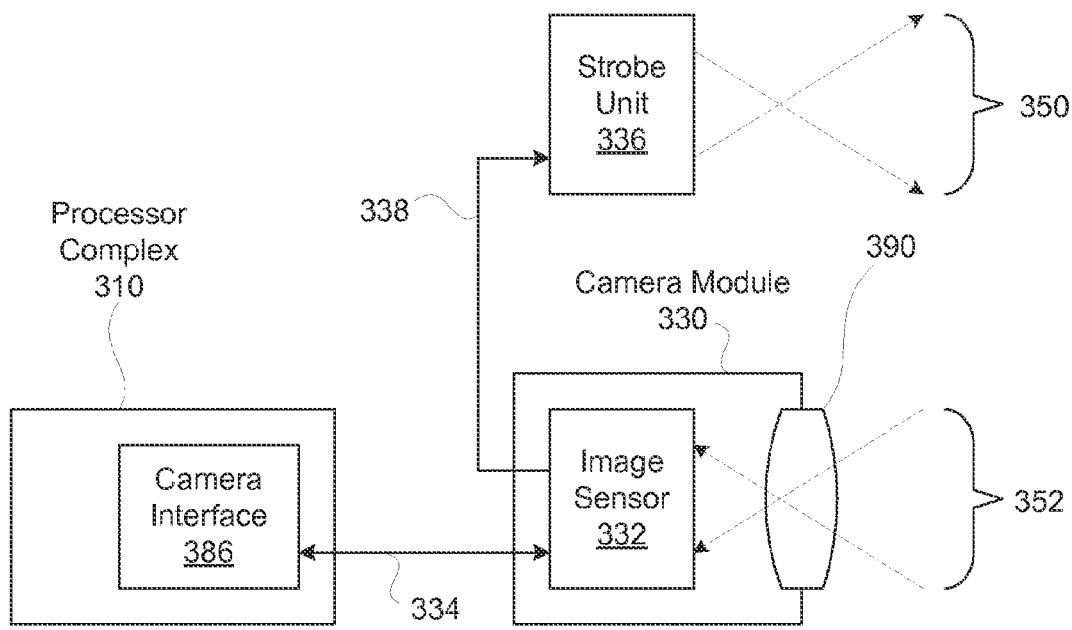
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
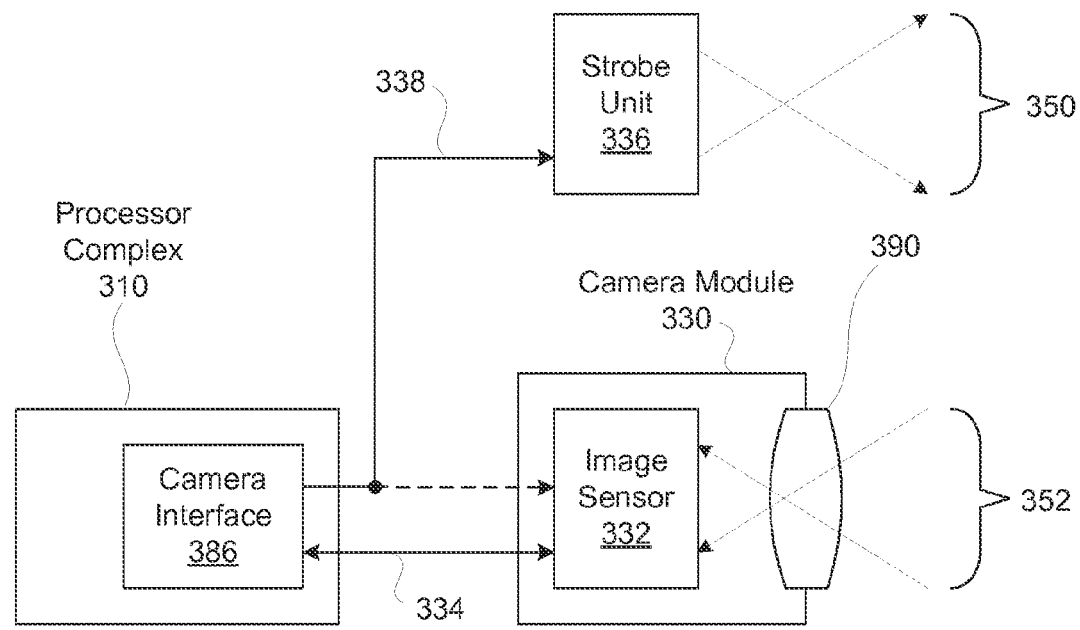
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white balance. Any technically feasible color statistics may be accumulated for estimating white balance, such as a sum of intensities for different color channels comprising red, green, and blue color channels. The sum of color channel intensities may then be used to perform a white balance color correction on an associated image, according to a white balance model such as a gray-world white balance model. In other embodiments, curve-fitting statistics are accumulated for a linear or a quadratic curve fit used for implementing white balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
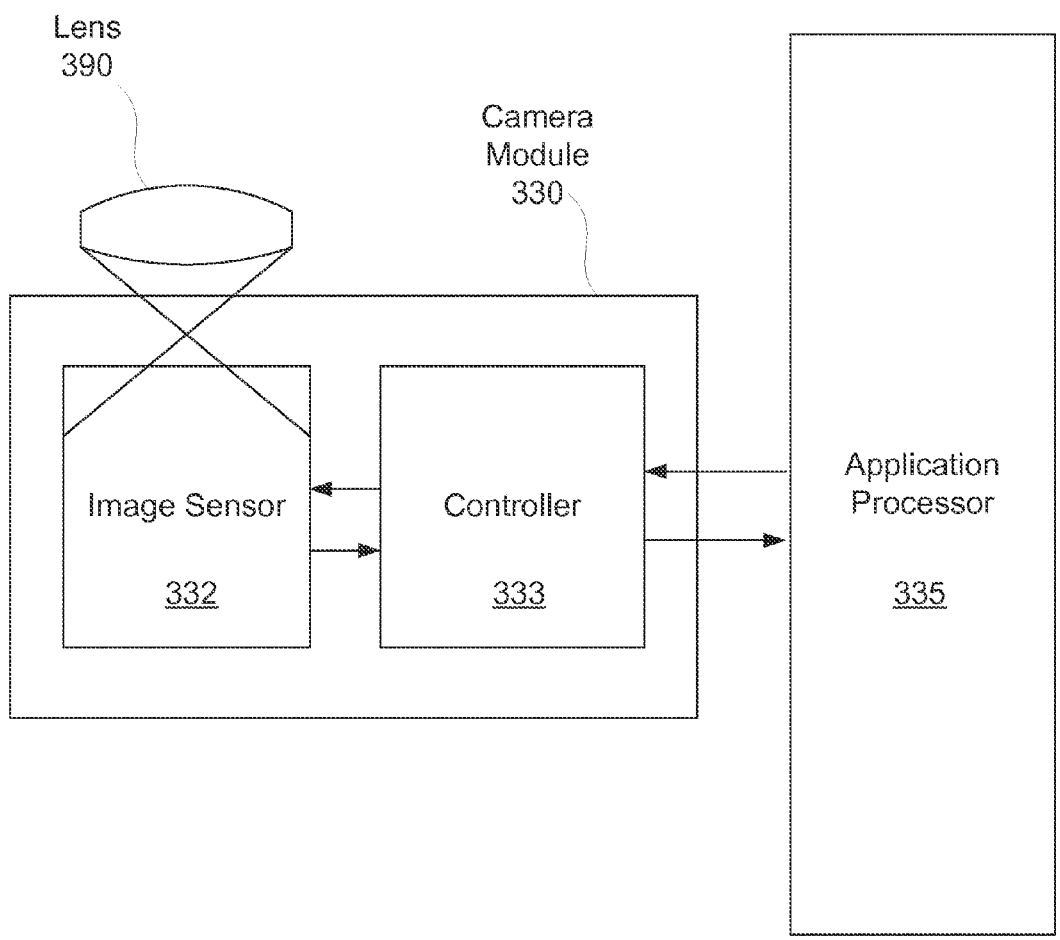
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
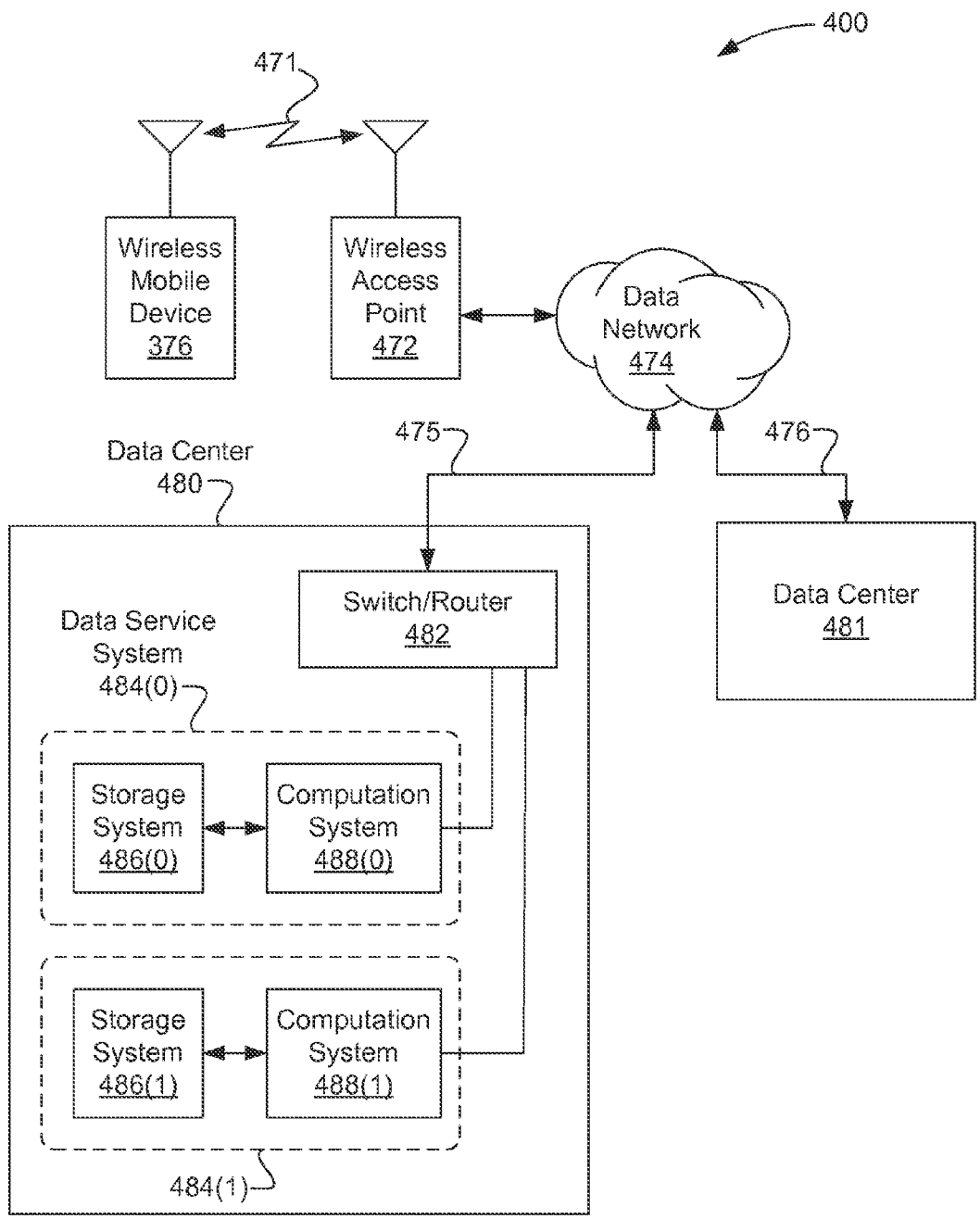
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471 without departing the scope and spirit of the present invention. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 5:
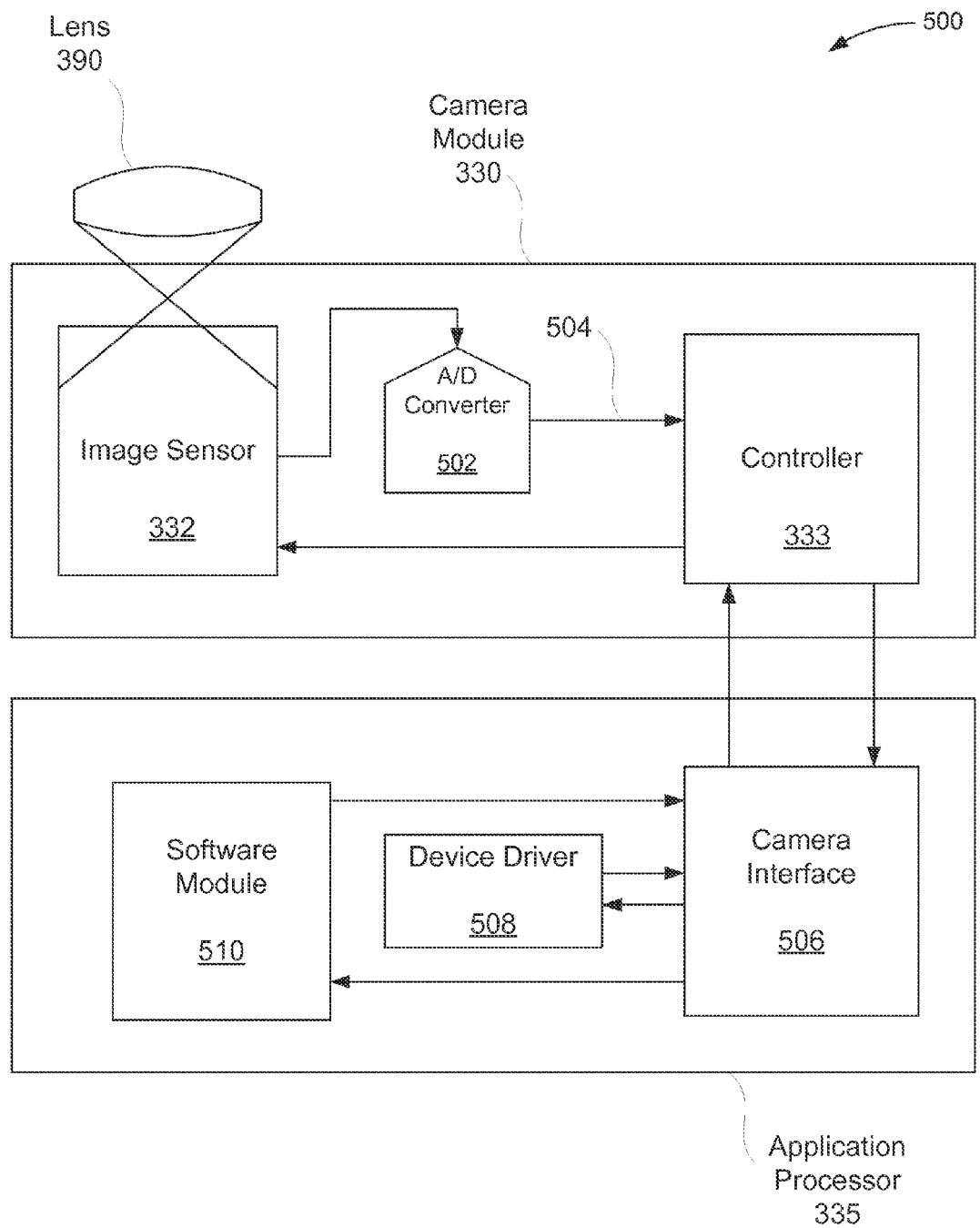
FIG. 5 illustrates a camera system in communication with an application processor, in accordance with an embodiment.

FIG. 5 illustrates a camera system 500 in communication with an application processor, in accordance with an embodiment. As an option, the camera system 500 may be implemented in the context of the details of any of the Figures disclosed herein. Of course, however, the camera system 500 may be carried out in any desired environment. Further, the aforementioned definitions may equally apply to the description below.

As shown, a camera module 330 may include an image sensor 332 which may be in communication with an analog to digital converter 502 ("A/D Converter") which may be in communication with a controller 333, which may be in communication with an application processor 335. In one embodiment, the A/D Converter output 504 is provided to controller 333. In another embodiment, the A/D Converter 504 is integrated within the controller 333.

In one embodiment, the lens 390 may be configured to focus optical scene information onto image sensor 332 to be sampled. The optical scene information sampled by the image sensor 332 may then be communicated from the image sensor 332 to the A/D Converter 502 and then to the controller 333 for at least one of subsequent processing and communication to the application processor 335. In another embodiment, the controller 333 may control storage of the optical scene information sampled by the image sensor 332, or storage of processed optical scene information.

In one embodiment, the controller 333 may be in direct communication with the image sensor 332. For example, in one embodiment, the controller may include a hardwired element logic which is configured to process at least some aspect of pixel data captured by the image sensor 332 and converted by the A/D converter 502. In such an embodiment, the controller may process the converted pixel data and provide resulting control signals back to the image sensor. For example, in one embodiment, the controller may process an exposure level for the capture image, and provide feedback in the form of control signals to the image sensor in response to the captured image (e.g. exposure is correct, exposure is overexposed, exposure is underexposed, etc.).

In another embodiment, the controller 333 may be in communication with the application processor 335. Additionally, as shown, the application processor 335 includes a camera interface 506 which may be in communication with a device driver 508 and with a software module 510.

In one embodiment, the camera interface 506 may receive a request from the controller 333 within the camera module 330, and may provide a result directly back to the controller 333. In another embodiment, the camera interface 506 may communicate with a device driver 508. In various embodiments, look ups may occur within the controller 333, within the camera interface 506, within the device driver 508, and/or within the software module 510.

In one embodiment, the device driver 508 may be used to determine a range associated with the pixel data. For example, in one embodiment, it may be desired to not focus on completely dark or completely light pixels. In such an embodiment, histogram data may be multiplied by a predefined interest curve, the result of which may be fed back to the image sensor to adjust the capture of the pixel data. Additionally, in one embodiment, multiplying the histogram data by an interest curve may allow the pixels in the middle of the histogram distribution to be the focus of the result. Of course, in other embodiments, the camera interface 506 and/or the software module 510 may be used to determine a range associated with the pixel data.

Further, in another embodiment, any of the components of the application processor 335 may be used in conjunction with the camera module 330 to assist in processing the pixel data (e.g. determine exposure of the pixel data, determine white balance of the pixel data, etc.), metering the pixel data (e.g. to determine proper exposure, etc.), outputting the pixel data (e.g. convert to JPEG, etc.), determining a point of interest (e.g. automatically or via manual feedback, etc.), tracking a point of interest, applying one of more optimized settings (e.g. based on manufacturer, based on cloud settings, etc.), and/or providing any other functionality in association with the image sensor 332. In one embodiment processor complex 310 of FIG. 3A includes application processor 335.

Figure 6:
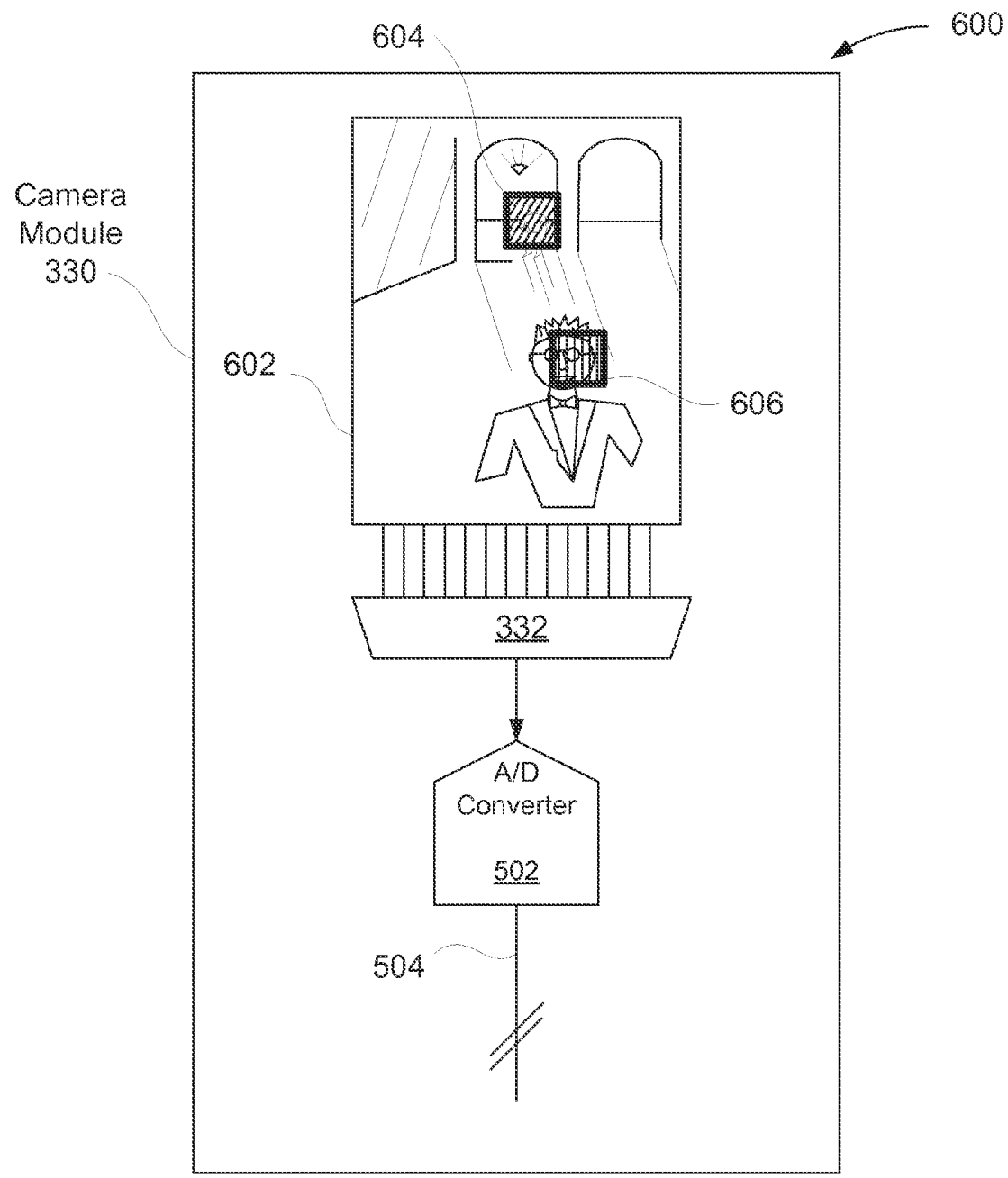
FIG. 6 illustrates a camera system for processing one or more points of interest, in accordance with an embodiment.

FIG. 6 illustrates a camera system 600 for processing one or more points of interest, in accordance with an embodiment. As an option, the camera system 600 may be implemented in the context of the details of any of the Figures disclosed herein. Of course, however, the camera system 600 may be carried out in any desired environment. Further, the aforementioned definitions may equally apply to the description below.

As shown, the camera module 330, as hitherto described, may include receiving an image 602 at an image sensor 332. Additionally, the image sensor 332 may output the image via an A/D Converter 502. In one embodiment, the image 602 may include one or more points of interest 604 606.

In some embodiments, the one or more points of interest 604 606 may be selected automatically be the device. For example, in one embodiment, a first exposure may be associated with the image and metered off of an indoor exposure setting. Additionally, a first point of interest (e.g. item 604, etc.) may correspond with an exposure associated with the outdoors, and a second point of interest (e.g. item 606, etc.) may correspond with an exposure associated with a face. In such an embodiment, the first exposure may have been initially metered (e.g. by a hardwired logic element, etc.) to optimize the results. The points of interest may have been selected by the device (e.g. based off of high overexposure area, based on a detected face and/or object, etc.).

In another embodiment, the points of interest may be selected manually by the user. For example, in one embodiment, an image may be outputted by the image sensor 332 via the A/D Converter 502 and displayed on a presentation device (e.g. screen, etc.). A user of the device may select (e.g. by touching the screen, etc.) a first point of interest (e.g. the outdoor, etc.) and indicate to darken the selected area. Additionally, the user may select a second point of interest (e.g. face, etc.) and indicate that the object selected is a face and optimized facial settings should apply. Based on these selections, exposure information generated from the points of interest (with the accompanying exposure and/or settings, etc.) are fed back to the image sensor 332. The image sensor may then proceed to capture the image based on the information associated with the points of interest.

In one embodiment, the image sensor 332 may capture multiple images (e.g. a first general exposure image, a second exposure based on the outdoor setting, a third exposure to optimize facial features, etc.), the multiple images being later blended together to form one cohesive resulting image. In a separate embodiment, the image sensor 332 may capture one set of pixel data, and more than one gain may be applied to the pixel data (e.g. a first ISO is applied to the pixel data, a second ISO is then applied to the pixel data, etc.), whereby each resulting image (e.g. gain+pixel data, etc.) is then used in combination with all other resulting images to form one resulting and blended image.

In some embodiments, blending the two or more resulting images may include assigning a priority to the point of interest. For example, in one embodiment, a first resulting image may be associated with a general exposure, and a second resulting image may be associated with a first point of interest, and when blending the first and second resulting images, the second image will be giving priority with respect to the first point of interest (i.e. the pixel data relating to the first point of interest will be blended primarily from the second image, etc.).

In a separate embodiment, capturing pixel data may relate to the point of interest. For example, in one embodiment, a first point of interest may be selected and the user may indicate that the exposure needs to be darkened (e.g. outdoor part, etc.). As such, the exposure may be decreased for that point of interest, and when capturing the pixel data, the image sensor may only capture pixel data as it relates to the point of interest (i.e. it does not capture pixel data for non point of interest locations, etc.). In this manner, a decrease amount of pixel data is captured as it may relate to the point of interest. This decreased amount of pixel data may then be processed more quickly to determine exposure information for capturing a whole image. In a separate embodiment, if the image sensor has captured the pixel data, and a first gain has been applied to the analog pixel data (e.g. first general exposure, etc.), a second gain may be applied to the analog pixel as it may relate to a first point of interest, and when applying the second gain to the analog pixel, the second gain may only be applied to the first point of interest (i.e. at the exclusion of other areas of the pixel data, etc.).

Of course, in other embodiments, after being outputted from the A/D Converter 502, the output may continue on to other components as here before described (e.g. FIG. 5, FIG. 3G, etc.).

Figure 7:
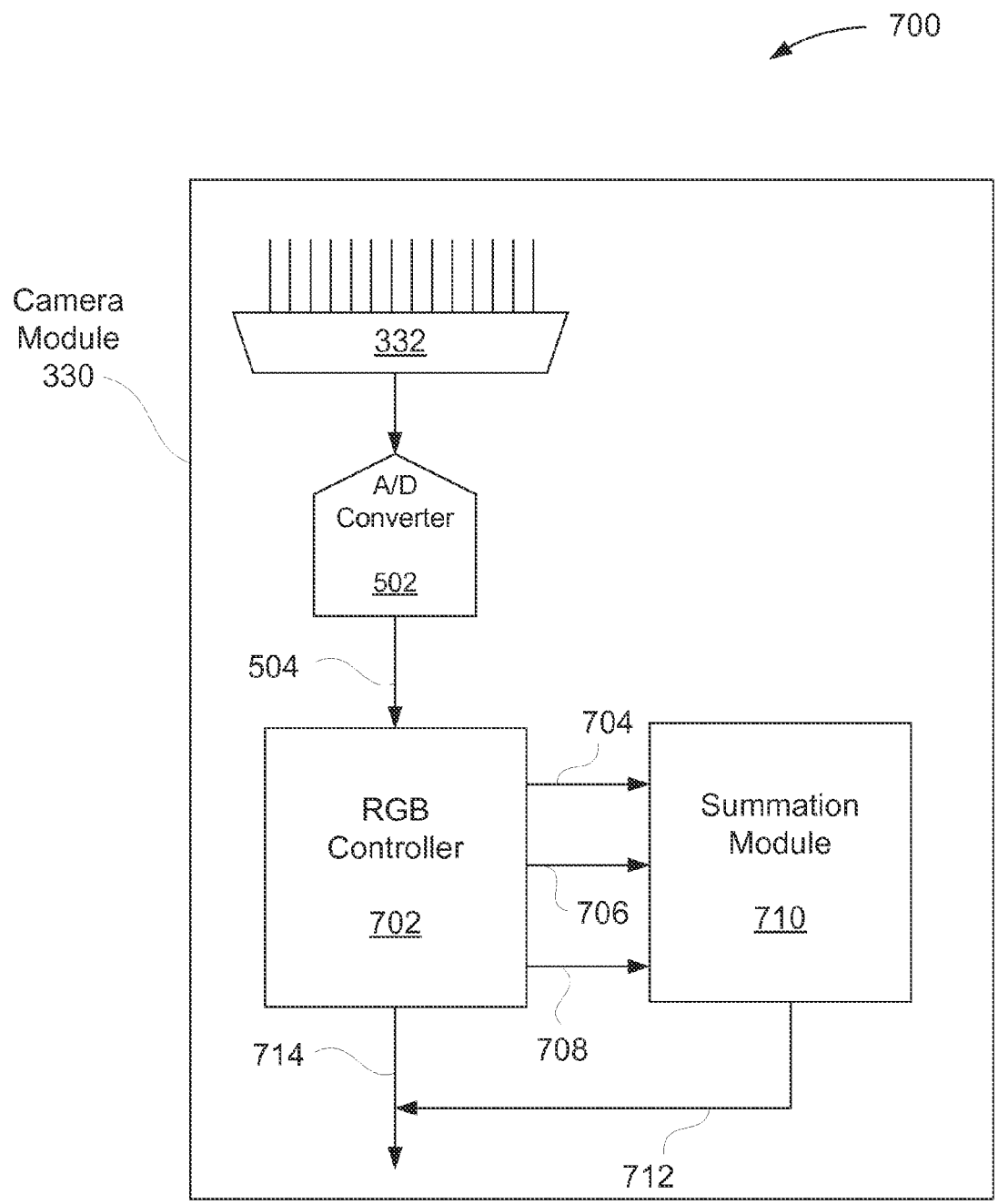
FIG. 7 illustrates a camera system for adjusting white balance, in accordance with an embodiment.

FIG. 7 illustrates a camera system 700 for adjusting white balance, in accordance with an embodiment. As an option, the camera system 700 may be implemented in the context of the details of any of the Figures disclosed herein. Of course, however, the camera system 700 may be carried out in any desired environment. Further, the aforementioned definitions may equally apply to the description below.

As shown, camera system 700 may include a camera module 330, an image sensor 332, an A/D Converter 502, an A/D Converter output 504, an RGB Controller 702, a red channel output 704, a green channel output 706, a blue channel output 708, a summation module 710, and a modification signal 712.

In various embodiments, the image sensor 332, A/D Converter 502, and A/D Converter output 504 may operate in a manner already described.

In one embodiment, the RGB Controller 702 may receive an output from A/D Converter 502 for processing. In one embodiment, the RGB Controller 702 may be used to determine the pixel intensity associated with each color channel of the pixel data. Additionally, the RGB 702 may be used to normalize each channel (e.g. red, green, blue, etc.).

After the RGB Controller 702 finishes processing the pixel data (e.g. normalizing each channel, etc.), RGB Controller 702 may output a color channel output. For example, in one embodiment, the RGB Controller 702 may output a coefficient for red, green, and blue color channels. In various embodiments, the coefficient may correspond with a red channel output 704, a green channel output 706, and a blue channel output 708.

In one embodiment, a coefficient may include an intensity value for one color channel for one pixel. For example, in one embodiment, correcting white balance may occur on a frame by frame basis in summation module 710, the feedback specifying an analog gain that causes the white balance constraint(s) (e.g. based on the color correction coefficients, etc.) to be accomplished. In such an embodiment, the white balance correction may be based, at least in part, on a gray world constraint (e.g. gray world algorithm, average of all colors is gray, etc.). Further, the feedback specifying an analog gain per color channel may be fed back to the image sensor 332.

In a separate embodiment, correcting white balance may occur on a frame by frame basis in summation module 710, the feedback specifying white balance correction which may be applied in the analog domain (e.g. at the image sensor 332, etc.), prior to digital quantization (e.g. by A/D Converter 502, etc.), or in the digital domain (e.g. at the RGB Controller 702, etc.). Of course, in one embodiment, feeding back the result of the operation may include providing the result to at least one of the image sensor, an analog-to-digital converter, or to a digital output from the analog-to-digital converter.

In one embodiment, the modification signal 712 may be applied to digital pixel data exiting the RGB Controller 702. In one embodiment, the RGB Controller 702 separates the digital pixel data into color components (e.g. red, green, blue, etc.), and sends the digital pixels via 704, 706, 708 (and/or any other path, etc.) to summation module 710. In one embodiment, the summation module sums and averages each of the individual color channels, assuming a gray world constraint.

In another embodiment, after exiting the summation module 710, the pixel data may be fed back into a RGB controller to determine whether any other parameters need to be modified (e.g. exposure, saturation, etc.). Of course, in other embodiments, the RGB Controller 702 and Summation Module 710 may be implemented on the same component (e.g. within the same image sensor die, a controller die, or a die in a processor complex/application processor, etc.).

In a separate embodiment, the Summation Module 710 may be used for other statistics associated with the pixel data. For example, in one embodiment, the summation module may sum values for color channel intensities, which may be used to calculate white balance correction factors. In such an embodiment, modification signal 712 may comprise a white balance compensation signal. In another embodiment, summation module 710 is configured to generate a histogram of a given frame; the histogram may then be processed to generate exposure information, which may be fed back to the image sensor 332 in a subsequent frame.

In one embodiment, applying the modification signal 712 to RGB Controller 702 output pixels 714 may include applying the correction factors (e.g. calculated by Summation Module 710, etc.) to the current (or any subsequent) image by the RGB Controller 702 (or another processing complex on the processor die, etc.). Additionally, the correction factors may be applied to a following (or next) image by the RGB Controller 702. In such an embodiment, applying the correction factors to a following image may have particular application to video frames where color correction (e.g. white balance, etc.) may be computed and corrected in real time on frames as they are played (i.e. frames are corrected on subsequent frames rather than computing and correcting on each frame which may otherwise slow down the display of the video stream, etc.).

In one embodiment, modification signal 712 may include statistics from the summation module 710, and the statistics (e.g. white balance statistics, white balance factors, exposure, exposure factors, etc.) may be passed through a low-pass filter (e.g. moving average filter, etc.) to provide a damping. For example, damping may allow a substantially new white balance to take effect within a few seconds, but not on the very next frame. As such, in one embodiment, as a scene changes (e.g. a camera is moved and focuses on a new object, etc.), the white balance may readjust based on the initial scene (where the camera was originally pointed) and the final scene (where the camera is currently pointed to), rather than readjusting the white balance on every frame as the camera is moved from one scene to a second scene.

Figure 8:
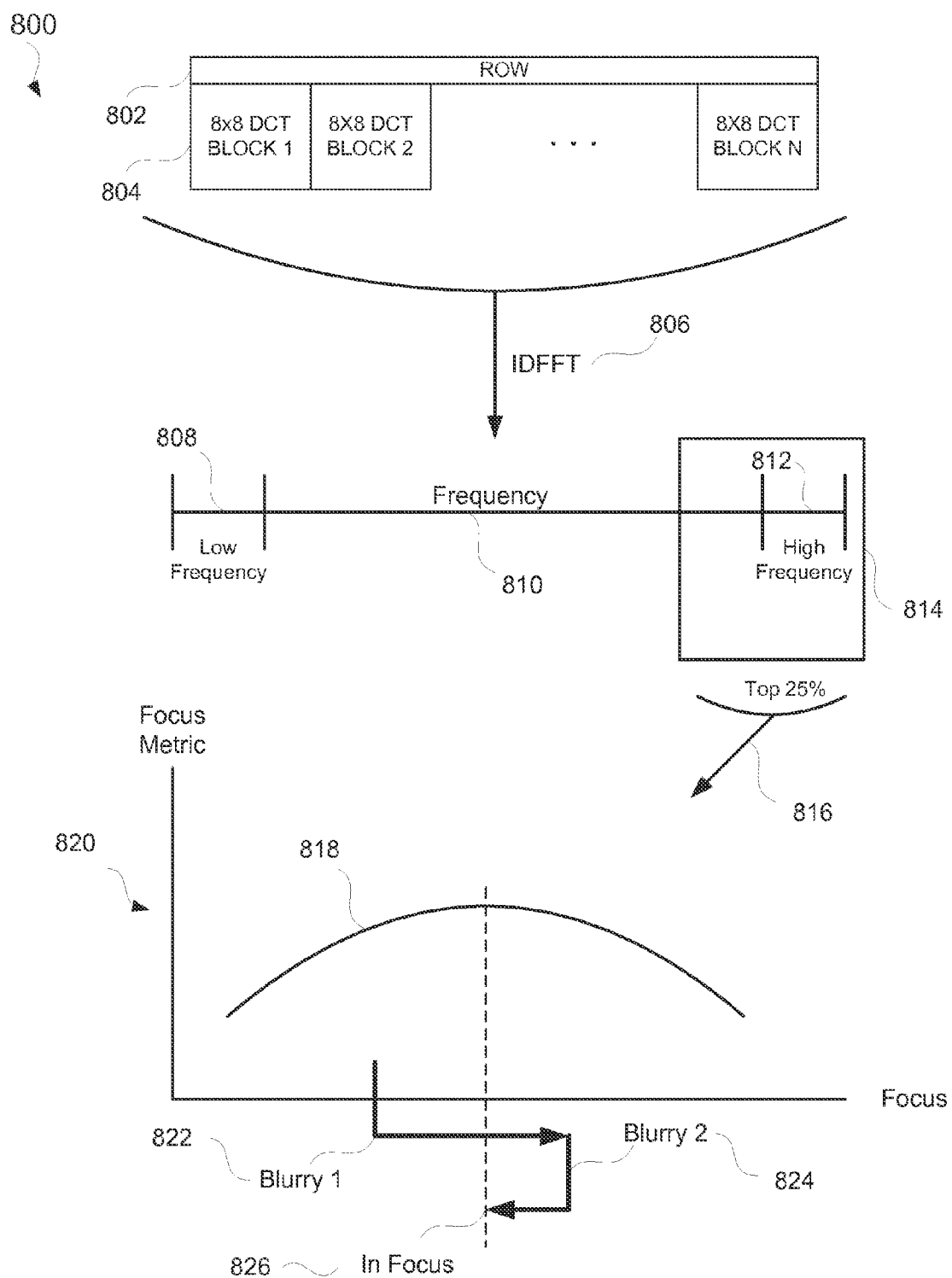
FIG. 8 illustrates a frequency method for focusing, in accordance with an embodiment.

FIG. 8 illustrates a frequency method 800 for focusing, in accordance with an embodiment. As an option, the frequency method 800 may be implemented in the context of the details of any of the Figures disclosed herein. Of course, however, the frequency method 800 may be carried out in any desired environment. Further, the aforementioned definitions may equally apply to the description below.

As shown, frequency method 800 may include a row 802 of pixel data. In one embodiment, the row 802 may include one or more blocks 804 of pixel data. In one embodiment, the one or more blocks 804 may include a set of 8×8 blocks of pixel data. Additionally, in one embodiment, a discrete cosine transform ("DCT") may be performed on the pixel data (e.g. blocks of pixel data, etc.). In other embodiments, the pixel data may have already been processed by a DCT.

In an alternative embodiment, lines of pixel data may be processed according to a one-dimensional Fast Fourier Transform (1DFFT) 806. In both such embodiments spatial domain image data (e.g., intensity image data) is transformed to frequency domain image data. Other techniques may be similarly applied to transform spatial domain image data to frequency domain image date.

As shown, a frequency domain graph 810 may include low frequency values 808 and high frequency values 812. In one embodiment, the frequency domain graph 810 may be used to categorize the pixel data based on one or more frequency values. In one embodiment, a sum of values representing the top 25% 816 of frequency domain values may be used as the basis to generate a focus signal.

In one embodiment, if an image is very much out of focus, and a DCT was performed on the image, there may be very low frequency components. This, for example, may be contrasted with an image which is in focus, and which may include a higher sum of high frequency components (e.g. DC component goes down, etc.). In such an embodiment, a hardwired logic element may be used to analyze at least one or more lines of pixel data, the analysis including performing a frequency analysis.

In a particular embodiment, a line of pixel data may be inputted into a hardwired logic element and an operation may be performed on the pixel data, including a 1DFFT (e.g. FFT, etc.), producing a result including both high and low frequency data. A histogram showing the frequency data may be compiled based on summing frequency values lines comprising an image frame. In this embodiment, a new line of pixel data may be inputted into a hardwired logic element, with the end summation of frequency values being generated within a frequency histogram for a given frame. In this manner, a complete histogram may be built based on lines of pixel data comprising a frame of pixel data. In one embodiment, a histogram parameter, such as the median frequency point may represent a focus metric, and maximizing the focus metric over a range of focus positions for a lens within a camera module may correspond with the point at which the image may be in optimal focus. This operation of computing a frequency domain histogram may be performed for a subregion within a frame, so as to focus an image about a focus point of interest. As shown, curve 818 depicts the focus metric as a function of lens focus position. As shown, a seeking operation may be performed to find a lens focus position that optimizes the focus metric. Of course, any technically feasible method may be used to compute the maximum value associated with the curve (e.g. derivative analysis, probability analysis based on tried values, etc.).

In this manner, in various embodiments, an entire image, or one or more points of interest associated with the image, may be used as the basis for computing the focus. In another embodiment, a set of 8×8 blocks of pixel data may be inputted into a hardwired element logic and an operation may be performed on the pixel data, including a DCT, producing a result including both high and low frequency data. The frequency values may be summed in a histogram for a particular range (and/or ranges) and the result may be used to generate the frequency histogram. In one embodiment, the frequency histogram may be used to compute the maximum value (e.g., a focus metric) based on multiple blocks of pixel data, rows of pixel data, columns of pixel data, etc. Of course, in some embodiments, the ability to focus may operate on any image data, including a scene and/or textual information, based on the foregoing descriptions. Additionally, in one embodiment, a focus metric for a particular frame may be the sum of the frequency components for that frame.

In other embodiments, a combination of software and hardware logic elements may be used to focus. For example, in one embodiment, a static scene may be entirely focused using hardware logic element. In another embodiment, however, a point of interest may be a child running around. In such an embodiment, software may be employed to enable tracking of the point of interest, and hardware logic element may be used to focus based on the determined location as set by the software. Of course, in other embodiments, any combination of the hardware and software may be used to focus the pixel data.

As shown, a plot 820 of the focus metric versus focus position is shown. In one embodiment, curve 818 corresponds to the focus metric value as a function of focus position. Additionally, a first point 822 represents a first blurry focus position ("Blurry 1"), and a second point 824 represents a second blurry focus position ("Blurry 2"). Based on the first point 822 and the second point 824, a correct point 826 is determined corresponding with the maximum focus metric point. In various embodiments, one or more processors may include two or more points along the focus metric curve 818 to determine a focus position. Of course, any method known in the art (e.g. take derivative to determine maximum, etc.) may be used to determine the highest focus metric value. In other embodiments, the focus metric curve 818 represents a simple sum of high frequency components for a frame. For example, focus metric 818 may represent a sum of the top 25% of frequency components as a function of focus position.

Figure 9:
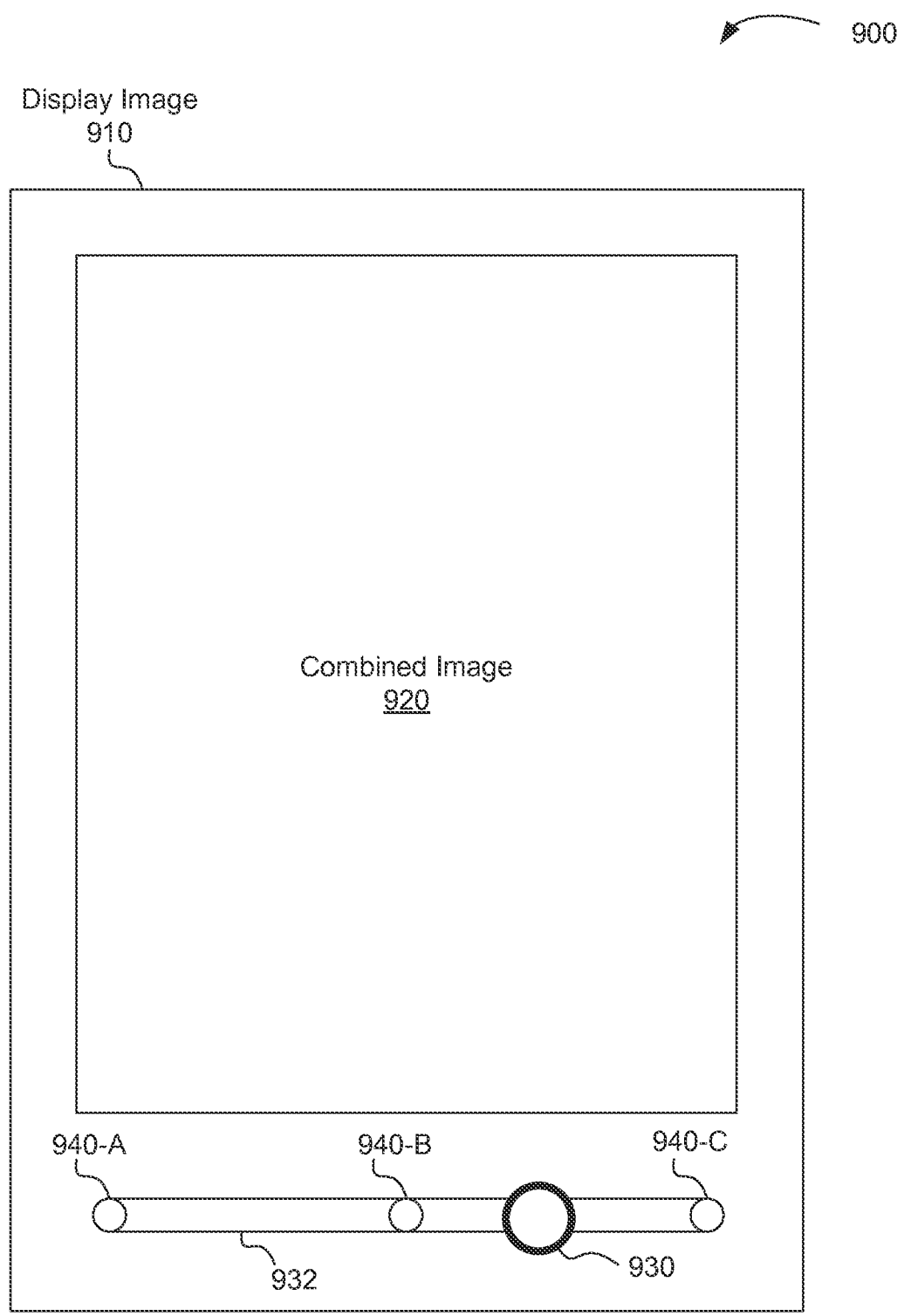
FIG. 9 illustrates a user interface for generating a combined image, in accordance with yet another embodiment.

FIG. 9 illustrates a user interface (UI) system 900 for generating a combined image 920, according to one embodiment of the present invention. As an option, the UI system 900 may be implemented in the context of the details of any of the Figures disclosed herein. Of course, however, the UI system 900 may be carried out in any desired environment. Further, the aforementioned definitions may equally apply to the description below.

In one embodiment, a combined image 920 comprises a combination of at least two related digital images. In one embodiment, the combined image 920 comprises, without limitation, a combined rendering of a first digital image and a second digital image. In another embodiment, the digital images used to compute the combined image 920 may be generated by amplifying an analog signal with at least two different gains, where the analog signal includes optical scene information captured based on an optical image focused on an image sensor. In yet another embodiment, the analog signal may be amplified using the at least two different gains on a pixel-by-pixel, line-by-line, or frame-by-frame basis.

In one embodiment, the UI system 900 presents a display image 910 that includes, without limitation, a combined image 920, a slider control 930 configured to move along track 932, and two or more indication points 940, which may each include a visual marker displayed within display image 910.

In one embodiment, the UI system 900 is generated by an adjustment tool executing within a processor complex 310 of a digital photographic system 300, and the display image 910 is displayed on display unit 312. In one embodiment, at least two digital images, such as the at least two related digital images, comprise source images for generating the combined image 920. The at least two digital images may reside within NV memory 316, volatile memory 318, memory subsystem 362, or any combination thereof. In another embodiment, the UI system 900 is generated by an adjustment tool executing within a computer system, such as a laptop computer or a desktop computer. The at least two digital images may be transmitted to the computer system or may be generated by an attached camera device. In yet another embodiment, the UI system 900 may be generated by a cloud-based server computer system, which may download the at least two digital images to a client browser, which may execute combining operations described below. In another embodiment, the UI system 900 is generated by a cloud-based server computer system, which receives the at least two digital images from a digital photographic system in a mobile device, and which may execute the combining operations described below in conjunction with generating combined image 920.

The slider control 930 may be configured to move between two end points corresponding to indication points 940-A and 940-C. One or more indication points, such as indication point 940-B may be positioned between the two end points. Each indication point 940 may be associated with a specific version of combined image 920, or a specific combination of the at least two digital images. For example, the indication point 940-A may be associated with a first digital image generated utilizing a first gain, and the indication point 940-C may be associated with a second digital image generated utilizing a second gain, where both of the first digital image and the second digital image are generated from a same analog signal of a single captured photographic scene. In one embodiment, when the slider control 930 is positioned directly over the indication point 940-A, only the first digital image may be displayed as the combined image 920 in the display image 99, and similarly when the slider control 930 is positioned directly over the indication point 940-C, only the second digital image may be displayed as the combined image 920 in the display image 910.

In one embodiment, indication point 940-B may be associated with a blending of the first digital image and the second digital image. For example, when the slider control 930 is positioned at the indication point 940-B, the combined image 920 may be a blend of the first digital image and the second digital image. In one embodiment, blending of the first digital image and the second digital image may comprise alpha blending, brightness blending, dynamic range blending, and/or tone mapping or other non-linear blending and mapping operations. In another embodiment, any blending of the first digital image and the second digital image may provide a new image that has a greater dynamic range or other visual characteristics that are different than either of the first image and the second image alone. Thus, a blending of the first digital image and the second digital image may provide a new computed HDR image that may be displayed as combined image 920 or used to generate combined image 920. To this end, a first digital signal and a second digital signal may be combined, resulting in at least a portion of a HDR image. Further, one of the first digital signal and the second digital signal may be further combined with at least a portion of another digital image or digital signal. In one embodiment, the other digital image may include another HDR image.

In one embodiment, when the slider control 930 is positioned at the indication point 940-A, the first digital image is displayed as the combined image 920, and when the slider control 930 is positioned at the indication point 940-C, the second digital image is displayed as the combined image 920; furthermore, when slider control 930 is positioned at indication point 940-B, a blended image is displayed as the combined image 920. In such an embodiment, when the slider control 930 is positioned between the indication point 940-A and the indication point 940-C, a mix (e.g. blend) weight may be calculated for the first digital image and the second digital image. For the first digital image, the mix weight may be calculated as having a value of 0.0 when the slider control 930 is at indication point 940-C and a value of 1.0 when slider control 930 is at indication point 940-A, with a range of mix weight values between 0.0 and 1.0 located between the indication points 940-C and 940-A, respectively. Referencing the mix operation, the mix weight may be calculated as having a value of 0.0 when the slider control 930 is at indication point 940-A and a value of 1.0 when slider control 930 is at indication point 940-C, with a range of mix weight values between 0.0 and 1.0 located between the indication points 940-A and 940-C, respectively.

In one embodiment, A mix operation may be applied to the first digital image and the second digital image based upon at least one mix weight value associated with at least one of the first digital image and the second digital image. In one embodiment, a mix weight of 1.0 gives complete mix weight to the digital image associated with the 1.0 mix weight. In this way, a user may blend between the first digital image and the second digital image. To this end, a first digital signal and a second digital signal may be blended in response to user input. For example, sliding indicia may be displayed, and a first digital signal and a second digital signal may be blended in response to the sliding indicia being manipulated by a user.

This system of mix weights and mix operations provides a UI tool for viewing the first digital image, the second digital image, and a blended image as a gradual progression from the first digital image to the second digital image. In one embodiment, a user may save a combined image 920 corresponding to an arbitrary position of the slider control 930. The adjustment tool implementing the UI system 900 may receive a command to save the combined image 920 via any technically feasible gesture or technique. For example, the adjustment tool may be configured to save the combined image 920 when a user gestures within the area occupied by combined image 920. Alternatively, the adjustment tool may save the combined image 920 when a user presses, but does not otherwise move the slider control 930. In another implementation, the adjustment tool may save the combined image 920 when a user gestures, such as by pressing a UI element (not shown), such as a save button, dedicated to receive a save command.

To this end, a slider control may be used to determine a contribution of two or more digital images to generate a final computed image, such as combined image 920. Persons skilled in the art will recognize that the above system of mix weights and mix operations may be generalized to include two or more indication points, associated with two or more related images without departing the scope and spirit of the present invention. Such related images may comprise, without limitation, any number of digital images that have been generated using a same analog signal to have different brightness values, which may have zero interframe time.

Furthermore, a different continuous position UI control, such as a rotating knob, may be implemented rather than the slider 930 to provide mix weight input or color adjustment input from the user.

Of course, in other embodiments, other user interfaces may be used to receive input relating to selecting one or more points of interest (e.g. for focus, for metering, etc.), adjusting one or more parameters associated with the image (e.g. white balance, saturation, exposure, etc.), and/or any other input which may affect the image in some manner.

Figure 10:
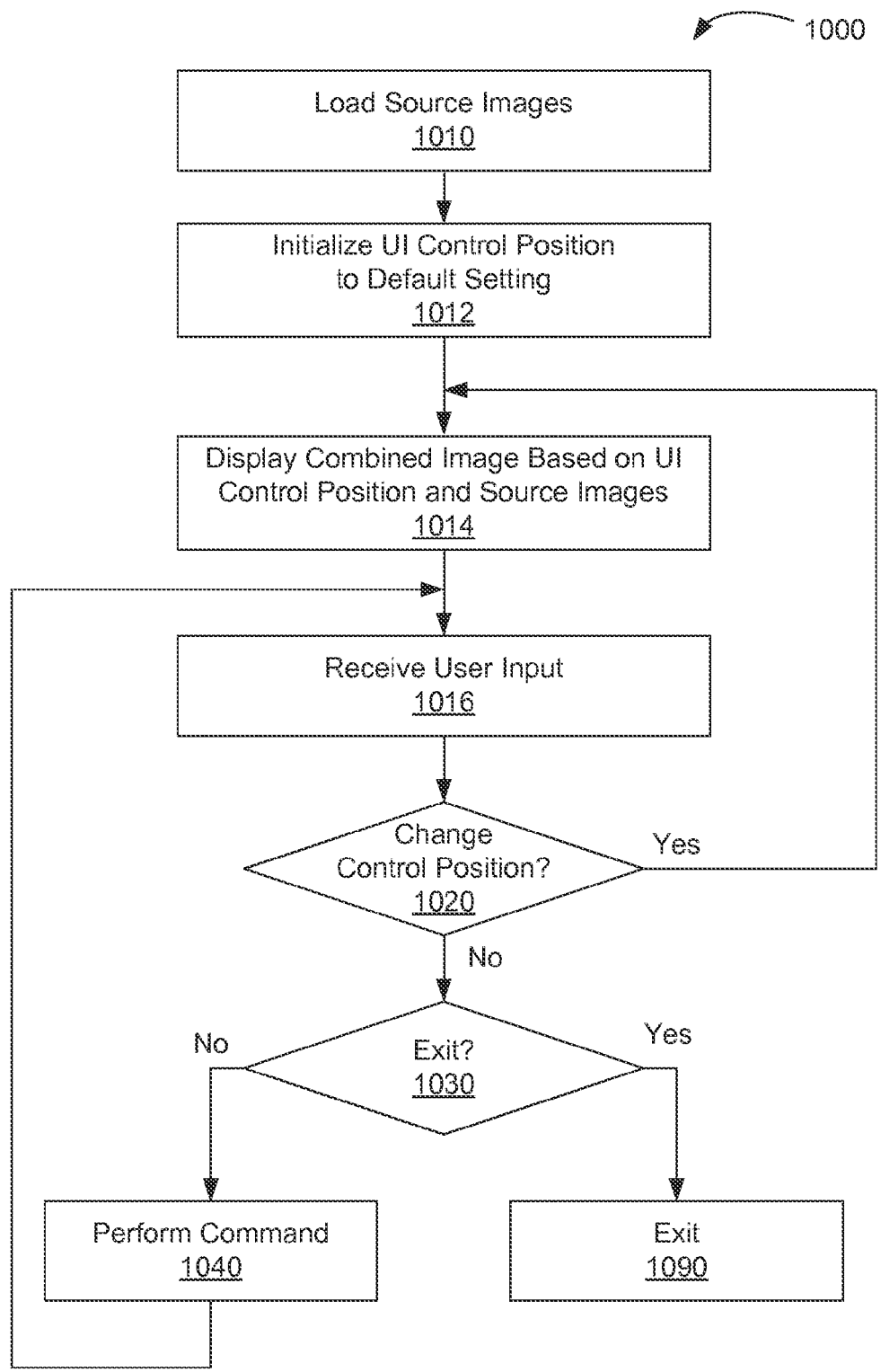
FIG. 10 is a flow diagram of method steps for generating combined image, in accord with an embodiment.

FIG. 10 is a flow diagram of method 1000 for generating a combined image, according to one embodiment of the present invention. As an option, the method 1000 may be implemented in the context of the details of any of the Figures disclosed herein. Of course, however, the method 1000 may be carried out in any desired environment. Further, the aforementioned definitions may equally apply to the description below.

The method 1000 begins in step 1010, where an adjustment tool executing within a processor complex, such as processor complex 310, loads at least two related source images, such as the first digital image and the second digital image described in the context of FIG. 9. In step 1012, the adjustment tool initializes a position for a UI control, such as slider control 930 of FIG. 9, to a default setting. In one embodiment, the default setting comprises an end point, such as indication point 940-A, for a range of values for the UI control. In another embodiment, the default setting comprises a calculated value based on one or more of the at least two related source images. In certain embodiments, the default setting is initialized to a value previously selected by a user in association with an image object comprising at least the first digital image and the second digital image.

In step 1014, the adjustment tool generates and displays a combined image, such as combined image 920 of FIG. 9, based on a position of the UI control and the at least two related source images. In one embodiment, generating the combined image comprises mixing the at least two related source images as described previously in FIG. 9. In step 1016, the adjustment tool receives user input. The user input may include, without limitation, a UI gesture such as a selection gesture or click gesture within display image 910. If, in step 1020, the user input should change the position of the UI control, then the adjustment tool changes the position of the UI control and the method proceeds back to step 1014. Otherwise, the method proceeds to step 1030.

If, in step 1030, the user input does not comprise a command to exit, then the method proceeds to step 1040, where the adjustment tool performs a command associated with the user input. In one embodiment, the command comprises a save command and the adjustment tool then saves the combined image, which is generated according to a position of the UI control. The method then proceeds back to step 1016.

Returning to step 1030, if the user input comprises a command to exit, then the method terminates in step 1090, where the adjustment tool exits, thereby terminating execution.

Of course, in various embodiments, the adjustment tool may be used to blend one or more points of interest, one or more white balance points, and/or any other parameter associated with the image. In some embodiments, the adjustment tool may relate to a full scene (e.g. entire image, etc.) associated with two or more images. In other embodiments, the adjustment tool may relate to a subset (e.g. a particular point(s), etc.) of the image.

One advantage of the present invention is that a digital photograph may be selectively generated based on user input using two or more different exposures of a single capture of a photographic scene. Accordingly, the digital photograph generated based on the user input may have a greater dynamic range than any of the individual exposures. Further, the generation of an HDR image using two or more different exposures with zero interframe time allows for the rapid generation of HDR images without motion artifacts.

Additionally, in various embodiments, when there is any motion within the scene, or the capturing device experiences any jitter during capture, some embodiments may address interframe exposure time will result in a motion blur within the final merged photograph. Such blur can be significantly exaggerated as interframe time increases. This problem renders HDR an ineffective solution for capturing clear images for any circumstance other than a highly static scene.

Further, in other embodiments, traditional techniques for generating a HDR photograph involve significant computational resources, as well as produce artifacts which reduce the image quality of the resulting image. Accordingly, strictly as an option, one or more of the above issues may or may not be addressed utilizing one or more of the techniques disclosed herein.

Still yet, in various embodiments, one or more of the techniques disclosed herein may be applied to a variety of markets and/or products. For example, although the techniques have been disclosed in reference to a photo capture, they may be applied to televisions, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
   a memory;
   a processor coupled to the memory; and
   an image sensor for:
   a) receiving one or more parameters associated with an image capture by the image sensor;
   b) in response to the image capture, receiving first pixel data;
   c) identifying a first aspect of the first pixel data, utilizing a hardwired logic element, wherein the first aspect of the first pixel data includes at least one of a white balance, a focus, an exposure, and an intensity, and the first aspect of the first pixel data further includes two or more points of interest, the two or more points of interest each including a region of pixels within the first pixel data;
   d) identifying two or more threshold values;
   e) performing an operation on the first pixel data in connection with the first aspect of the first pixel data, utilizing the hardwired logic element, wherein the operation includes comparing the first aspect of the first pixel data to the two or more threshold values;
   f) feeding back a result of the operation;
   g) adjusting the one or more parameters based on the feedback;
   h) repeating at least one of e), f), and g), until the result of the operation satisfies a predetermined requirement, the predetermined requirement including the two or more threshold values; and
   i) applying the one or more parameters to the image sensor, wherein the one or more parameters are applied before second pixel data is captured.

2. The apparatus of claim 1, wherein the apparatus is operable such that the feeding back the result of the operation includes providing the result to at least one of the image sensor, an analog-to-digital converter, or to a digital output from the analog-to-digital converter.

3. The apparatus of claim 1, wherein the apparatus is operable such that the result includes at least one of an outcome of normalizing or summing elements associated with an exposure of the first pixel data, an outcome of normalizing or summing elements associated with a white balance of the first pixel data, an outcome of normalizing or summing elements associated with a focus of the first pixel data, and an outcome of normalizing or summing elements associated with an intensity of the first pixel data.

4. The apparatus of claim 1, wherein the apparatus is operable such that the performing the operation occurs, at least in part, in an application processor.

5. The apparatus of claim 1, wherein the apparatus is operable such that the performing the operation occurs, at least in part, in a camera module.

6. The apparatus of claim 1, wherein the apparatus is operable such that the performing the operation occurs entirely in a camera module.

7. The apparatus of claim 1, wherein the apparatus is operable such that the predetermined requirement involves a maximum value, or a range.

8. The apparatus of claim 7, wherein the apparatus is operable such that the predetermined requirement involves the range, and the range includes at least a median value.

9. The apparatus of claim 7, wherein the apparatus is operable such that the predetermined requirement involves the range, and the range includes a 40%-60% histogram distribution associated with the first aspect of the first pixel data.

10. The apparatus of claim 7, wherein the apparatus is operable such that the predetermined requirement involves the range, and the range includes a specific set point associated with the first aspect of the first pixel data.

11. The apparatus of claim 1, wherein the apparatus is operable such that the two or more points of interest include at least one of two or more points of white balance, two or more points of focus, two or more points of exposure, or two or more points of intensity.

12. The apparatus of claim 1, wherein the apparatus is operable such that the first aspect of the first pixel data is associated with a white balance value, and feeding back the result of the operation includes adjusting the first pixel data based on the white balance value.

13. The apparatus of claim 12, wherein the apparatus is operable such that the adjusting occurs utilizing the hardwired logic element, and occurs entirely within a camera module.

14. The apparatus of claim 1, wherein the apparatus is operable such that the identifying of the first aspect of the first pixel data includes summing two or more values for a region associated with the first pixel data, and determining a range of highest histogram points associated with the first pixel data for the region, the performing the operation being based on the range of highest histogram points associated with the first pixel data for the region wherein the two or more values include frequency values associated with at least one of an exposure, a white balance, and a focus.

15. The apparatus of claim 14, wherein the apparatus is operable such that the range of highest histogram points includes a top 10% of histogram points associated with the first pixel data for the region.

16. A computer program product embodied on a non-transitory computer readable medium, comprising:
 a) code for receiving one or more parameters associated with an image capture by an image sensor;
 b) in response to the image capture, code for receiving first pixel data;
 c) code for identifying a first aspect of the first pixel data, utilizing a hardwired logic, wherein the first aspect of the first pixel data includes at least one of a white balance, a focus, an exposure, and an intensity, and the first aspect of the first pixel data further includes two or more points of interest, the two or more points of interest each including a region of pixels within the first pixel data;
 d) code for identifying two or more threshold values;
 e) code for performing an operation on the first pixel data in connection with the first aspect of the first pixel data, utilizing the hardwired logic element, wherein the operation includes comparing the first aspect of the first pixel data to the two or more threshold values;
 f) code for feeding back a result of the operation;
 g) adjusting the one or more parameters based on the feedback;
 h) code for repeating at least one of e), f), and g), until the result of the operation satisfies a predetermined requirement, the predetermined requirement including the two or more threshold values; and
 i) code for applying the one or more parameters to the image sensor, wherein the one or more parameters are applied before second pixel data is captured.

17. A method, comprising:
 a) receiving one or more parameters associated with an image capture by an image sensor;
 b) in response to the image capture, receiving first pixel data;
 c) identifying a first aspect of the first pixel data, utilizing a hardwired logic element, wherein the first aspect of the first pixel data includes at least one of a white balance, a focus, an exposure, and an intensity, and the first aspect of the first pixel data further includes two or more points of interest, the two or more points of interest each including a region of pixels within the first pixel data;
 d) identifying two or more threshold values;
 e) performing an operation on the first pixel data in connection with the first aspect of the first pixel data, utilizing the hardwired logic element, wherein the operation includes comparing the first aspect of the first pixel data to the two or more threshold values;
 f) feeding back a result of the operation;
 g) adjusting the one or more parameters based on the feedback;
 h) repeating at least one of e), f), and g), until the result of the operation satisfies a predetermined requirement, the predetermined requirement including the two or more threshold values; and
 i) applying the one or more parameters to the image sensor, wherein the one or more parameters are applied before second pixel data is captured.

* * * * *